US010777223B2

(12) United States Patent
Teramoto et al.

(10) Patent No.: US 10,777,223 B2
(45) Date of Patent: Sep. 15, 2020

(54) METHOD OF FEEDING AGENT AND STRUCTURAL OBJECT SUBJECTED TO THE METHOD

(71) Applicant: NHK SPRING CO., LTD., Yokohama-shi, Kanagawa (JP)

(72) Inventors: Yoshihiro Teramoto, Kanagawa (JP); Masaru Inoue, Kanagawa (JP); Takeshi Shimoda, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 15/884,598

(22) Filed: Jan. 31, 2018

(65) Prior Publication Data

US 2018/0286457 A1  Oct. 4, 2018

(30) Foreign Application Priority Data

Mar. 30, 2017 (JP) .................................. 2017-68624

(51) Int. Cl.
  *G11B 5/48* (2006.01)
  *G11B 5/596* (2006.01)
(52) U.S. Cl.
  CPC ............ *G11B 5/4826* (2013.01); *G11B 5/483* (2015.09); *Y10T 29/49025* (2015.01)
(58) Field of Classification Search
  None
  See application file for complete search history.

(56) References Cited

U.S. PATENT DOCUMENTS

| 2003/0172526 | A1* | 9/2003 | Komatsubara et al. ..................... H05K 3/44 29/846 |
| 2010/0155113 | A1* | 6/2010 | Kamei ................... G11B 5/486 174/255 |
| 2011/0061594 | A1 | 3/2011 | Ando et al. |
| 2012/0033395 | A1* | 2/2012 | Ishii et al. ........... H05K 3/4644 29/829 |
| 2014/0368954 | A1 | 12/2014 | Inoue et al. |

FOREIGN PATENT DOCUMENTS

| CN | 102378490 A | 3/2012 |
| JP | 08-206560 A | 8/1996 |
| JP | 2006-140288 A | 6/2006 |

(Continued)

*Primary Examiner* — Craig A. Renner
(74) *Attorney, Agent, or Firm* — Norris McLaughlin, P.A.

(57) ABSTRACT

The present invention provides a method of feeding an agent, capable of stabilizing a remaining agent of a feeding part in characteristic and amount just before definitively feeding an agent to each definitive portion. The method includes intermittently moving a feeding part to a plurality of definitive portions defined on a structural object to definitively feed a flowable agent with a predetermined amount to each one of the definitive portions. The structural object includes a semi-finished product part with the definitive portions and a frame to be separated from the semi-finished product part. The frame includes a waste portion for the flowable agent. The waste portion has a same form as the definitive portions. The feeding part wastefully feeds the flowable agent to the waste portion with a same amount as the predetermined amount and thereafter starts the intermittently moving for the definitively feeding of the flowable agent.

11 Claims, 15 Drawing Sheets

(56) References Cited

FOREIGN PATENT DOCUMENTS

| | | |
|---|---|---|
| JP | 2007-038141 A | 2/2007 |
| JP | 2007-144348 A | 6/2007 |
| JP | 2011-062579 A | 3/2011 |
| JP | 2012-024715 A | 2/2012 |
| JP | 2015-001993 A | 1/2015 |

\* cited by examiner

METHOD OF FEEDING AGENT AND
STRUCTURAL OBJECT SUBJECTED TO
THE METHOD

BACKGROUND OF THE INVENTION

1. Field of the Invention

The present invention relates to a method of feeding a flowable agent such as unhardened adhesive agent to an object and a structural object subjected to the method.

2. Description of the Related Art

A hard disk drive (HDD) is heretofore used in an information processing device such as personal computer. In the hard disk drive, a head suspension is used. The head suspension includes a load beam, a flexure laid on the load beam, and the like. A gimbal portion is formed in the vicinity of the front end of the flexure and includes a slider attached thereto and composing a magnetic head. To the slider, elements or transducers are provided to access a hard disk for date reading or data writing.

In such a hard disk drive, it is important for realizing high density of the hard disk to position a magnetic head to a recording surface of a hard disk with more high accuracy.

For this accurate positioning, there is a dual-stage actuator (DSA) using a positioning motor (voice coil motor) and one or more micro actuator elements such as piezoelectric elements (lead zircon titanate "PZT") together.

In a head suspension of an initial DSA, one or more micro actuator elements are arranged between a load beam and a base plate. The micro actuator elements deform according to voltage applied thereto to minutely displace at high speed a magnetic head side on the front end of the head suspension in a sway direction (width direction of a track).

Recently, as a head suspension of an advanced DSA, there is disclosed by JP2015-001993A or the like a co-located type in which micro actuator elements are co-located or arranged side by side in the vicinity of a magnetic head of a flexure.

In this co-located type, the micro actuator elements are smaller than of a milli-actuator type and terminals for the micro actuator elements have a very small size of approximate 0.1 mm square.

Accordingly, it is very important to control a feed rate of an unhardened agent such as adhesive agent and solder paste through which the micro actuator elements are attached to the flexure.

FIG. 20 is a perspective view illustrating a chain sheet 101 for mass production.

In a mass production line for the head suspension of the co-located type, an unhardened agent is applied to the chain sheet 101 in which a plurality of flexure elements 103 are arranged side by side and chained together as illustrated in FIG. 20.

In particular, a feeding head 105 (feeding part) is intermittently moved relative to the chain sheet 101 to definitively feed an unhardened agent to each specified portion of each flexure element 103 into a drop shape with a predetermined amount. In FIG. 20, the definitively feeding of the agent is conceptually illustrated by arrows for some flexure elements 103. Hereinafter, the specified portion is referred to as the "definitive portion" and the definitively feeding of the agent to the definitive portion is also referred to as the "definitive feed".

In this case, there is a problem that the feed amount of the agent is not stabilized such that it is below a specified level in the first definitive feed or feeds if the feeding head 105 moves directly from a standby position or initial position to a flexure element 103 on the chain sheet 101 and starts definitive feeds of the agent during the intermittent movement.

To cope this problem, a waste stage 107 is arranged for wastefully feedings or wasteful feeds of the agent that are conducted before the definitive feeds based on a concept similar to the technique disclosed in JP2006-140288A, JP2007-144348A, JP2011-62579A, JPH08-206560A, JP2007-038141A, or JP2012-024715A. Hereinafter, the wastefully feeding is referred to also as the "wasteful feed" and the portion to which the wasteful feed or feeds are to be conducted is referred to as the "waste portion".

When the wasteful feeds are conducted, the feeding head 105 moves from the standby position to the stage 107 as illustrated by an arrow A and wastefully feeds the agent on the stage 107. Then, the feeding head 105 moves to the first flexure element 103 and definitively feeds the agent onto the first flexure element 103 as illustrated by an arrow B. Thereafter, the feeding head 105 moves at constant pitches to conduct the definitive feeds to each flexure element 103.

The wasteful feeds using the stage 107, however, are not enough to stabilize the respective feed amounts of the definitive feeds of the agent.

One of causes of that destabilization is a distance between the waste portion of the stage 107 and the definitive portion of the first flexure element 103 that is greater than a distance between the definitive portions of the adjacent flexure elements 103. Further, another one of causes of that destabilization is the waste portion on the stage 107 having a different shape from the definitive portion on the flexure element 103.

The difference in the distance causes the agent to change in characteristic according to volatilization or the like during the movement of the feeding head 105.

The difference in shape between the waste portion and the definitive portion makes the remaining agent in the nozzle of the feeding head 105 after the wasteful feeds have the different amount from the remaining agent after the definitive feeds.

Accordingly, there is still the problem of the destabilization of the feed amount of the agent of the first definitive feeds to the first flexure element 103 even if the wasteful feeds are conducted at the stage 107 and thereafter the definitive feeds are conducted to each flexure element 103 on the chain sheet 101.

In this regard, a wasteful region is formed on a main body of a circuit board to conduct wasteful feeds in JP2006-140288 and the like.

The wasteful region, however, needs enlargement of the main body of the circuit board.

Further, JP2006-140288 involves a difference in shape between the wasteful region and a region in which wiring is formed. The difference in shape may make the remaining agent in the feeding head serving as the feeding part, in particular the nozzle, after the wasteful feeds have the different amount from the remaining agent after the definitive feeds.

SUMMARY OF THE INVENTION

An object of the present invention is to provide a method of feeding an agent and a structural object subjected to the method, capable of stabilizing a remaining agent of a feeding part in characteristic and amount when definitively feeding an agent to each definitive portion.

In order to accomplish the object, a first aspect of the present invention provides a method of feeding an agent. The method comprises intermittently moving a feeding part to a plurality of definitive portions defined on a structural object to definitively feed a flowable agent with a predetermined amount to each one of the definitive portions. The structural object includes a semi-finished product part with the definitive portions and a frame to be separated from the semi-finished product part. The frame includes a waste portion for the flowable agent. The waste portion has a same form as the definitive portions. Then, the feeding part wastefully feeds the flowable agent to the waste portion with a same amount as said predetermined amount and thereafter starts the intermittently moving for the definitively feeding of the flowable agent.

A second aspect of the present invention provides a structural object having a semi-finished product part and a frame to be separated from the semi-finished product part, definitive portions formed on the semi-finished product part to be definitively fed a flowable agent, and a waste portion formed on the frame to be wastefully fed the flowable agent, the waste portion having a same form as the definitive portions.

According to the first aspect, the frame includes the waste portion for the flowable agent and the waste portion has the same form as the definitive portions. Accordingly, the waste portion is the same as the definitive portions in surface characteristic such as shape, and/or a positional relationship between the waste portion and the first definitive portion to which the agent is firstly definitively fed is the same as a positional relationship between the adjacent definitive portions.

This stabilizes the remaining agent of the feeding part in characteristic and amount not only between the definitive portions but also between the waste portion and the definitive portion, thereby to stabilize the feed amount of the agent at each definitive portion into the predetermined amount.

The frame including the waste portion is separated from the semi-finished product part and therefore the semi-finished product part or the finished product part is not unnecessarily enlarged.

According to the second aspect, the structural object includes the frame with the waste portion for the flowable agent and the waste portion is the same form as the definitive portions. The structural object is, therefore, suitable for the method according to the first aspect.

DETAILED DESCRIPTION OF EMBODIMENTS

Embodiments according to the present invention provide a waste portion with the same form as definitive portions for a method of feeding an agent and a structural object subjected to the method, capable of stabilizing a remaining agent of a feeding part in characteristic and amount just before definitively feeding an agent to each one of the definitive portions.

Namely, a method according to the embodiments intermittently moves a feeding head relative to a plurality of definitive portions of a chain sheet of flexure elements to definitively feed an unhardened agent to each definitive portion into a drop shape with a predetermined amount. The chain sheet includes a semi-finished product part with the definitive portions and a frame to be separated from the semi-finished product part. The frame includes a waste portion for the adhesive agent. The waste portion has the same form, in particular the same surface characteristic and positional relation, as the definitive portions. Then, the feeding head wastefully feeds the adhesive agent to the waste portion with the same amount as said predetermined amount and thereafter starts the intermittently moving for the definitively feeding of the adhesive agent.

The chain sheet includes a semi-finished product part and a frame to be separated from the semi-finished product part, definitive portions formed on the semi-finished product part to be definitively fed an adhesive agent, and a waste portion formed on the frame to be wastefully fed the adhesive agent, the waste portion having the same form, in particular the same surface characteristic and positional relation, as the definitive portions.

Hereinafter, the embodiments of the present invention will be explained in detail with reference to drawings that exemplify a head suspension that is a co-located type including micro actuator elements arranged side by side in the vicinity of a magnetic head. The method of feeding an agent according to the present invention may be applied to mounting of micro actuator elements to the other member to be minutely driven or the other type of the head suspension having the micro actuator elements between a base plate and a load beam. Further, the method according to the present invention may be applied to the other technique disclosed in JP2006-140288A, JP2007-144348A, JP2011-62579A, JPH08-206560A, JP2007-038141A, or JP2012-024715A.

First, an actuator-mounting portion and the periphery thereof in the co-located type of the head suspension will be generally explained with reference to FIGS. 1-4.

Figure 1:
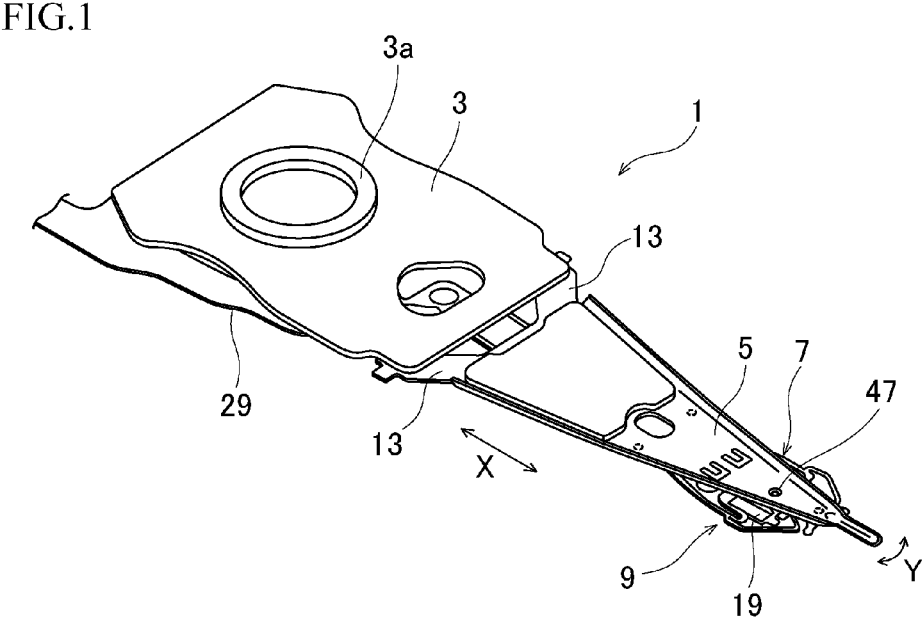
FIG. 1 is a perspective view illustrating a head suspension viewed from a first side according to a first embodiment of the present invention.
Figure 2:
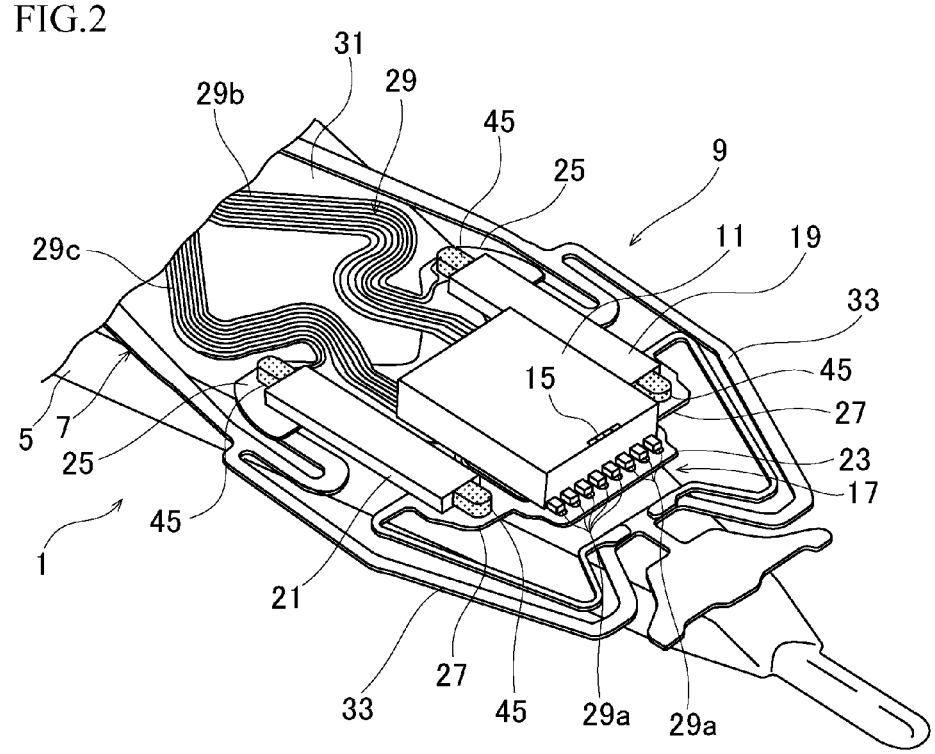
FIG. 2 is a perspective view illustrating an actuator-mounting portion, viewed from a second side on which a slider is arranged, of the head suspension of FIG. 1.

FIG. 1 is a perspective view illustrating a head suspension viewed from a first side and FIG. 2 is a perspective view illustrating an actuator-mounting portion, viewed from a second side on which a slider is arranged, of the head suspension.

The head suspension 1 of FIG. 1 is provided with a base plate 3, a load beam 5, a flexure 7 with conductors, an actuator-mounting portion 9 and the like.

The base plate 3 is fixed to an arm of a carriage. The base plate 3 has a boss 3a to be inserted into a hole formed on the arm.

A direction along an arrow X of FIG. 1 is a longitudinal direction or a front and rear direction of a load beam 5 or a head suspension 1. A direction along an arrow Y is a turning direction or a sway direction of the head suspension 1. A direction along a tangent line relative to the sway direction is a widthwise direction of a slider 11.

On a base end or a rear end of the load beam 5, resilient parts 13 are formed. The flexure 7 is arranged along the load beam 5.

As illustrated in FIG. 2, the slider 11 has an end serving as a magnetic head on which elements 15 such as a MR element are provided to mutually convert between magnetic and electrical signals. With the elements 15, the head suspension 1 accesses a disk incorporated in a hard disk drive to read or write data from or to the disk. The slider 11, the load beam 5, the flexure 7 and the like compose a head gimbal assembly.

The actuator-mounting portion 9 includes a gimbal portion 17 and a pair of micro actuator elements 19 and 21. The gimbal portion 17 is formed on the front end of the flexure 7. The pair of the micro actuator elements 19 and 21 are arranged, on the gimbal portion 17, on both sides of the slider 11 in the widthwise direction, respectively.

The micro actuator elements 19 and 21 are plates made of piezoelectric elements such as PZT, respectively, and have a function to turn and position the slider 11 in the sway direction.

Figure 3:
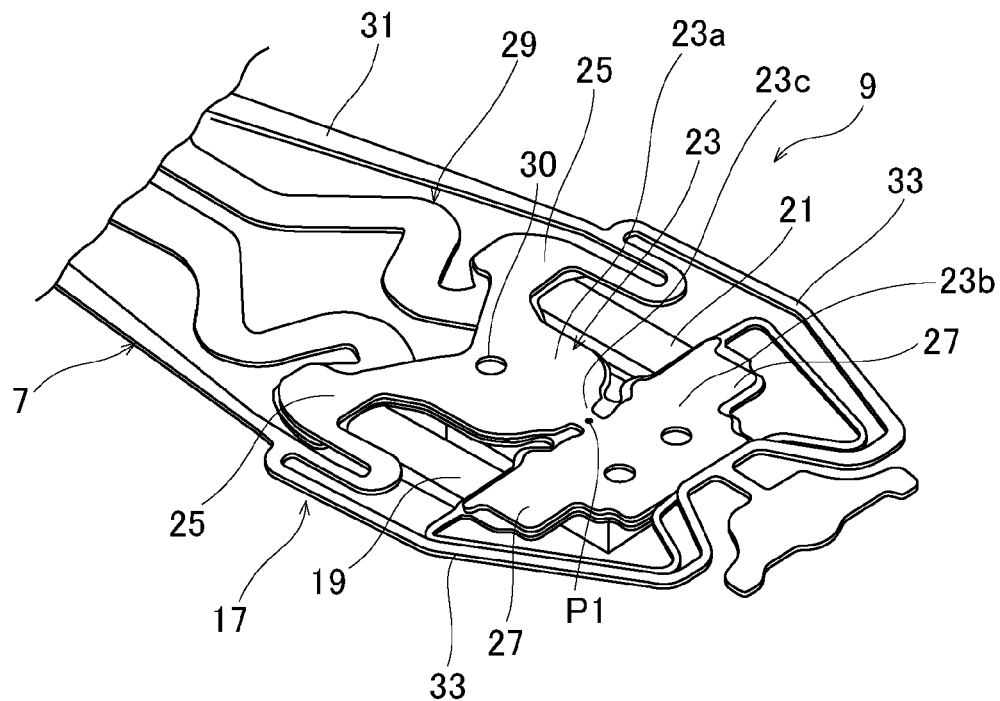
FIG. 3 is a perspective view illustrating the actuator-mounting portion of the head suspension of FIG. 1 with absence of a load beam.
Figure 4:
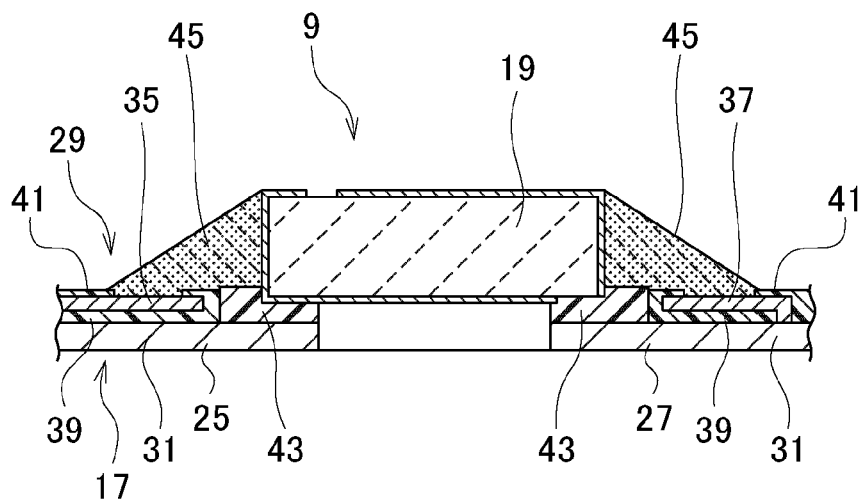
FIG. 4 is a sectional view illustrating a micro actuator element fixed to the actuator-mounting portion of FIG. 2 using an adhesive agent and the periphery thereof.

FIG. 3 is a perspective view illustrating the actuator-mounting portion 9 viewed from the first side with absence of the load beam 5, and FIG. 4 is a sectional view illustrating the micro actuator element 19 fixed to the actuator-mounting portion 9 using an adhesive agent 43 and the periphery thereof. The plane of section of FIG. 4 cuts the one micro actuator element 19 in the X direction of FIG. 1 (the "X direction" hereinafter means the "X direction of FIG. 1"). The other micro actuator element 21 has basically the same structure as the micro actuator element 19 and therefore only the micro actuator element 19 will be explained as a representative for those elements.

As illustrated in FIGS. 1-4, the gimbal portion 17 is provided with a tongue 23. The tongue 23 has the slider 11 mounted thereon. The tongue 23 includes a stationary part 23a and a movable part 23b. The stationary part 23a and the movable part 23b are connected to each other through a hinge 23c so that the movable part 23b is movable relative to the stationary part 23a in the sway direction.

The stationary part 23a of the tongue 23 has a first support portion 25 for the micro actuator element 19 and has a reference hole 30. The reference hole 30 is used for image processing when mounting the micro actuator element 19 on the tongue 23.

The movable part 23b of the tongue 23 has a second support portion 27 for the micro actuator element 19. On the movable part 23b, terminals 29a of a wiring part 29 are formed to be connected to the slider 11. The terminals 29a are conducted separately to read traces 29b and write traces 29c of the wiring part 29.

The flexure 7 having the actuator-mounting portion 9 includes a metal base 31 made of a thin metal foil or plate. The wiring part 29 is arranged along the metal base 31. An example of the metal foil that is the material of the metal base 31 is an austenite steel foil having a thickness of about 12-25 μm, in particular about 18 μm. The metal base 31 is fixed to the load beam 5 using laser welding or the like. The rear end of the flexure 7 extends rearward from the base plate 3.

The metal base 31 of the flexure 7 has outriggers 33 in the actuator-mounting portion 9. The outriggers 33 resiliently support the slider 11.

In the actuator-mounting portion 9, terminals 35 for the micro actuator element 19 is formed on both sides of the wiring part 29 in the widthwise direction. The terminals 35 are located on the first support portion 25. On the second support portion 27, ground terminals 37 are located. The ground terminals 37 are electrically conductivity connected to the metal base 31.

A layered structure or sectional structure of the wiring part 29 includes an insulating layer 39, conductors of the read traces 29b and the write traces 29c, and a cover layer 41. The insulating layer 39 is made of resin with electric insulation such as polyimide. The conductors of the read traces 29b and the write traces 29c are formed into a wiring pattern made of, for example, copper foil. The cover layer 41 is made of resin with electric insulation such as polyimide.

As an example, the insulating layer 39 has the thickness of about 5-20 μm, in particular about 10 μm, the conductors the thickness of about 4-15 μm, in particular about 9 μm, and the cover layer 41 the thickness of about 2-10 μm, in particular about 5 μm.

The metal base 31 has the thickness of about 12-25 μm and the load beam 5 has the smaller thickness (for example, 30 μm) than the metal base 31, for example.

The micro actuator element 19 extends in the X direction, both ends of which are fixed to the first and second support portions 25 and 27 through first adhesive agents 43 having electric insulation, respectively.

The micro actuator element 19 has electrodes that are electrically connected to the terminals 35 and 37 on the respective first and second support portions 25 and 27 through second adhesive agents 45 having electrical conductivity.

The second adhesive agents 45 are solids of silver paste as an example. The silver paste includes a resin base serving as organic binder and a number of electrically conductive particles (silver particles) mixed into the resin base. Curing or solidifying unhardened silver paste at a room temperature or by heating, the conductive particles or silver particles are brought into electrically contact with each other. The second adhesive agents 45 may be solids of solder paste or the other conductive adhesive agent.

The load beam 5 includes a dimple 47 in the vicinity of the front end thereof (FIG. 1). The dimple 47 is protruded from the load beam 5 toward the gimbal portion 17 of the flexure 7 so as to have a convex surface. The convex surface has an apex that is in contact with the hinge 23c of the tongue 23 (FIG. 3). The gimbal portion 17 is tiltably supported with the load beam 5 around a contact point P1 between the dimple 47 and the hinge 23c.

Accordingly, the head suspension 1 turns in a radial direction of the disk incorporated in the hard disk drive by turning the carriage using the positioning motor. This moves the slider 11 of the magnetic head onto a target track on the recording surface of the disk.

At this time, voltage is applied to the micro actuator elements 19 and 21 to contract one of the elements 19 and 21 and elongate the other of the elements 19 and 21. This causes the tongue 23 to minutely move in the sway direction, thereby to rapidly and precisely position the elements 15 on the slider 11 in the sway direction.

Figure 5:
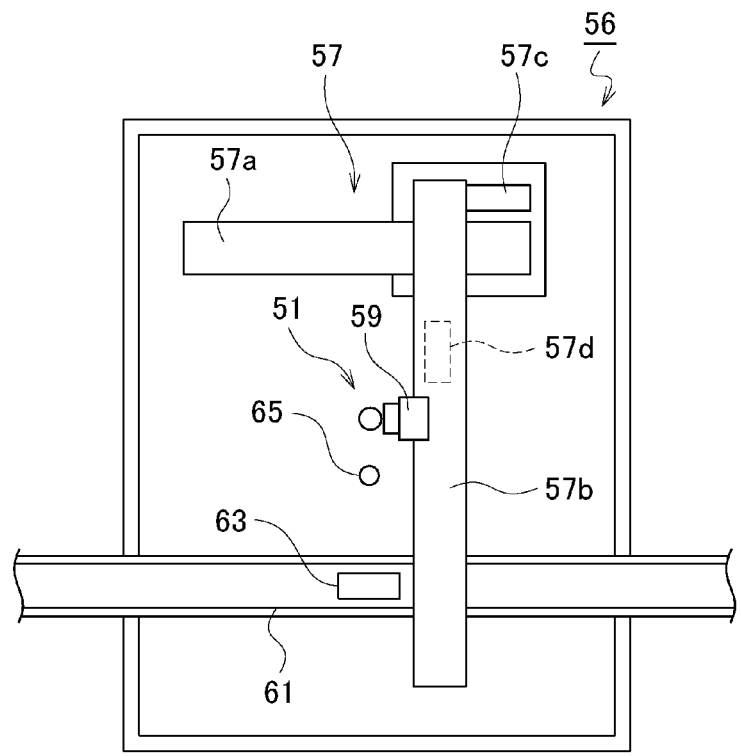
FIG. 5 is a plan view illustrating an outline of an agent-feeding apparatus according to the first embodiment.
Figure 7:
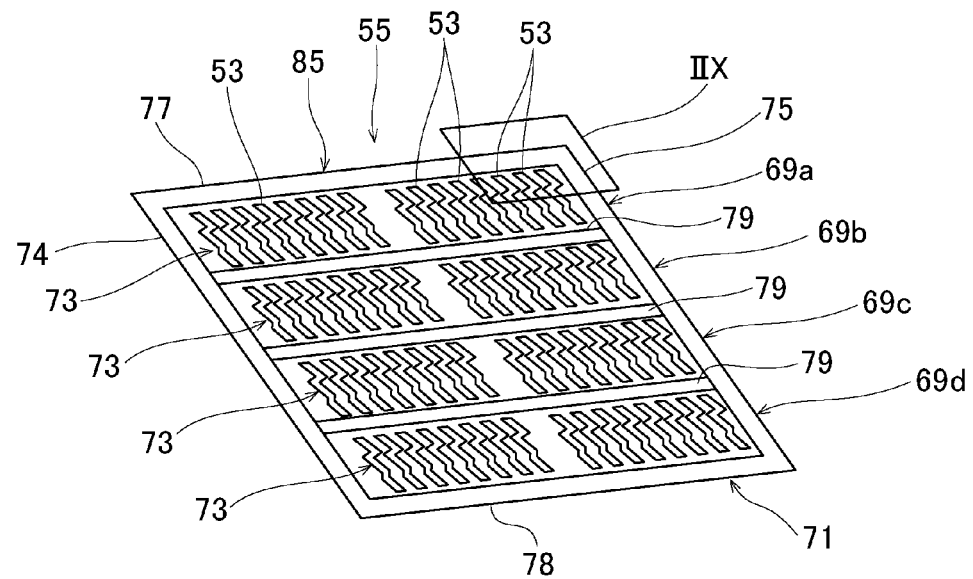
FIG. 7 is a perspective view illustrating a chain sheet according to the first embodiment.
Figure 8:
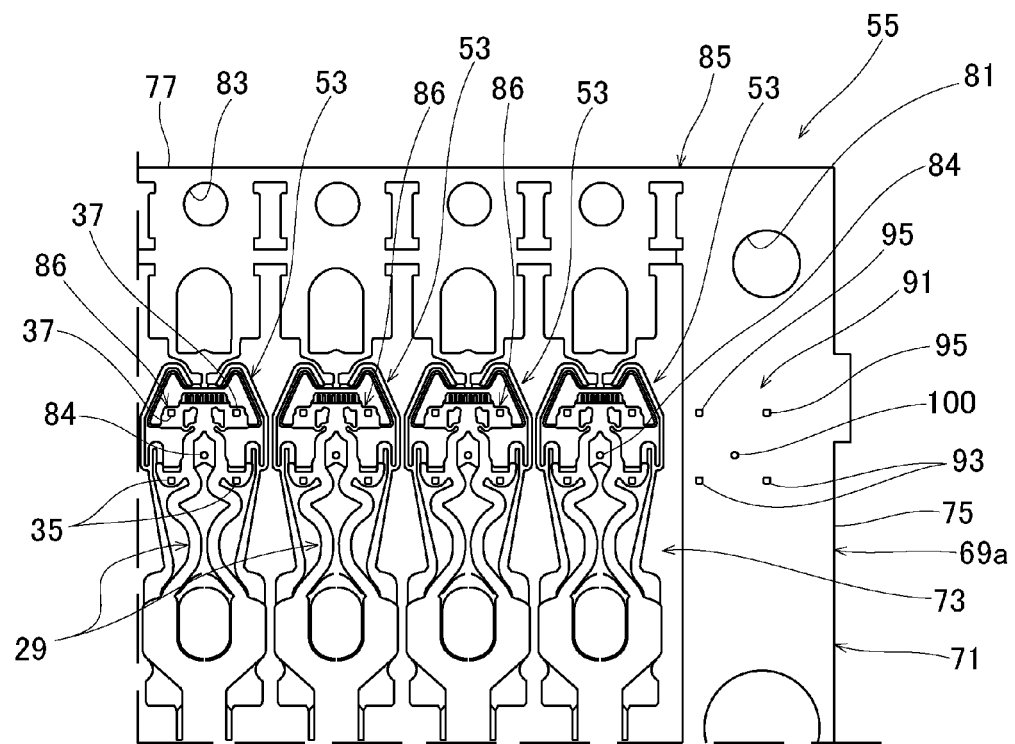
FIG. 8 is a plan view of a part IIX of the chain sheet of FIG. 7.

An outline of a method of feeding an agent will be explained with reference to FIGS. 5-8. Hereinafter, the method is referred to as the "agent-feeding method". FIG. 5 is a plan view illustrating an outline of an agent-feeding apparatus 56, FIG. 6 is a side view illustrating a feeding head 51 of the agent-feeding apparatus 56, FIG. 7 is a perspective view illustrating a chain sheet 55, and FIG. 8 is a plan view of a part IIX of the chain sheet 55 of FIG. 7.

The agent-feeding method according to the first embodiment feeds an unhardened adhesive agent that is a flowable agent to the first and second support portions 25 and 27 into a drop shape, to attach the micro actuator elements 19 and 21 to the first and second support portions 25 and 27 through the adhesive agent.

Figure 6:
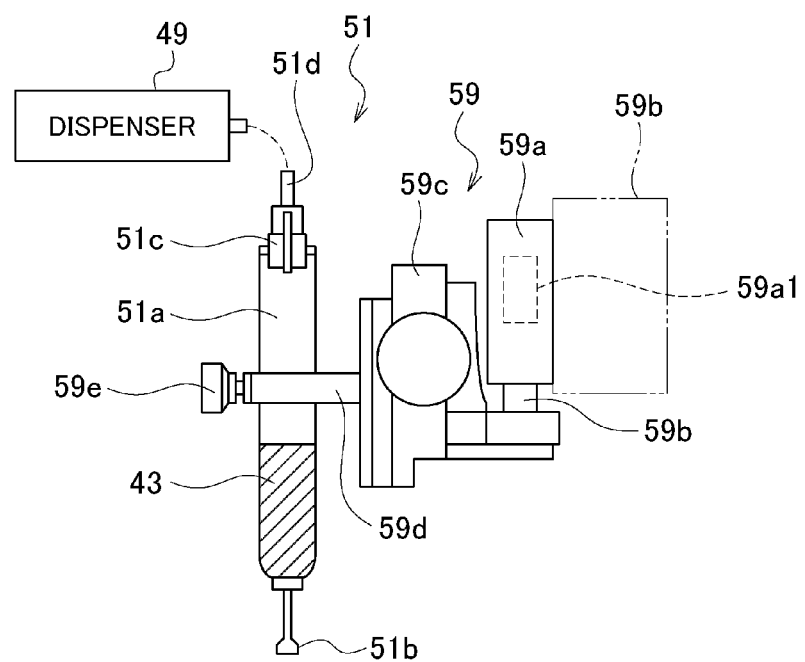
FIG. 6 is a side view illustrating a feeding head of the agent-feeding apparatus of FIG. 5.

As an example of the feeding part, a combination of a dispenser 49 and the feeding head 51 is used in the agent-feeding apparatus 56 as illustrated in FIGS. 5-6. As an example of the structural object, the chain sheet 55 of flexure elements 53 is used as illustrated in FIGS. 7-8. The flexure elements 53 are semi-finished flexures that are in the middle of the mounting process of parts.

The agent-feeding method according to the first embodiment definitively feeds the unhardened adhesive agent to each flexure element 53 of the chain sheet 55 to attach the micro actuator elements 19 and 21 to each flexure element 53. Before the definitively feeding the agent to the first flexure element 53, the agent-feeding method wastefully feeds the unhardened adhesive agent to a waste portion on the chain sheet 55 with the same amount as the predetermined amount for the definitive portion to which the unhardened adhesive agent is definitively fed.

As illustrated in FIGS. 5-6, the agent-feeding apparatus 56 used for the agent-feeding method according to the first embodiment is provided with a XY-axis arm mechanism 57, a Z-axis driving mechanism 59, a conveyer 61, a definitively feeding stage 63, and a touch sensor 65 in addition to the dispenser 49 and the feeding head 51.

The XY-axis arm mechanism 57 has an X-axis arm 57a, a Y-axis arm 57b, an X-axis driving motor 57c, and a Y-axis driving motor 57d.

The X-axis driving motor 57c reciprocates the Y-axis arm 57b along the X-axis arm 57a. The Y-axis driving motor 57d reciprocates the Z-axis driving mechanism 59 along the Y-axis arm 57b.

The X-axis and Y-axis driving motors 57c and 57d are driven by drive control signals output from a controller and input into the driving circuits thereof. With this, the XY-axis arm mechanism 57 is operated to move the feeding head 51 to an instructed position in the XY-axis directions.

The Z-axis driving mechanism 59 has a base 59a, a rod 59b, an intermediate supporting part 59c, a rod 59d, and a stopper 59e.

The base 59a is reciprocatively movably supported with the Y-axis arm 57b. The base 59a is provided with a Z-axis driving motor 59a1 that reciprocatively drives the rod 59b in the Z-axis direction.

The rod 59b has a function to transmit driving action of the Z-axis driving motor 59a1 to the intermediate supporting part 59c and the rod 59d.

The Z-axis driving mechanism 59 is configured to operate the Z-axis driving motor 59a1 when a drive control signal from the controller is input to a driving circuit thereof. With this, the Z-axis mechanism 59 is operated to move the feeding head 51 to an instructed position in the Z-axis direction.

The feeding head 51 is movable relative to a definitively feeding stage 63 from a standby position or initial position and functions to definitively and wastefully feed the unhardened adhesive agent.

As illustrated in FIG. 6, the feeding head 51 is provided with a syringe 51a having an approximately cylindrical shape, a nozzle 51b provided at the lower end of the syringe 51a, a lid 51c provided at the top end of the syringe 51a, and a tube 51d. The feeding head 51 is fixed by the stopper 59e at the tip end of the rod 59d in the vertical direction or Z-axis direction.

The syringe 51a accommodates the unhardened adhesive agent 43 to be fed. The unhardened adhesive agent 43 is to be discharged from the tip end of the nozzle 51b by compressed air introduced into the syringe 51a from the dispenser 49. The agent 43 may heat curable, ultraviolet curable or the like.

The nozzle 51b is a part from which the agent 43 in the syringe 51a is discharged. According to the first embodiment, the nozzle 51b is formed into a multi-outlet nozzle. The multi-outlet nozzle has outlets corresponding to after-mentioned definitive spots of the definitive portion to feed the adhesive agent 43 to the respective definitive spots. According to the first embodiment, the nozzle 51b has four outlets and simultaneously feeds drops of the adhesive agent 43 to respective four definitive spots of the definitive portion of the actuator-mounting portion 9. The number of the outlets may be changed according to the number of the definitive spots.

The nozzle 51b may be formed into a single-outlet nozzle. The single-outlet nozzle has a single outlet to successively feed the agent 43 to the four definitive spots of the definitive portion.

The lid 51c is provided with a tube 51d. The tube 51d is led from the lid 51c to the dispenser 49 to carry compressed air into the syringe 51a.

The definitively feeding stage 63 is formed on the conveyer 61.

The touch sensor 65 is used for origin positioning of the feeding head 51 in the Z-axis direction.

On the definitively feeding stage 63, the chain sheet 55 of FIG. 7 is put.

The chain sheet 55 of FIG. 7 is used in manufacturing process for the flexure. The chain sheet 55 includes a plurality of frame units 69a, 69b, 69c, and 69d. Each one of the frame units 69a-69d has a frame 71 and a semi-finished product part 73. The number of the frame units may be changed according to manufacturing process or the like.

The frame 71 is a part to be separated from the semi-finished product part 73 after mounting required parts on the semi-finished product part 73.

The frame 71 according to the first embodiment is provided with outer vertical portions 74 and 75, outer lateral portions 77 and 78, and a plurality of intermediate lateral portions 79. The outer vertical portions 74 and 75 include a first positioning hole 81 and the like. The outer lateral portion 77 includes second positioning holes 83 and the like. The intermediate lateral portions 79 partitions the inside of the frame 71 that is surrounded by the outer vertical portions 74 and 75 and the outer lateral portions 77 and 78 into the frame units 69a-69d.

The semi-finished product part 73 is formed for each one of the frame unites 69a-69d. The semi-finished product part 73 includes flexure elements 53 as a plurality of objects that are arranged side by side and chained together. The number of the flexure elements 53 is, for example, several tens to several hundreds.

The chained flexure elements 53 in each one of the frame units 69a-69d is separated into two groups in the lateral direction. Between the groups, there is a first gap larger than a second gap between the adjacent flexure elements 53. The difference between the first and second gaps should be set so as not to affect the characteristic of the agent.

The flexure element 53 is to be cut off as a flexure for a head suspension after mounting required parts thereon. Hereinafter, the reference numerals for the flexure 7 substantially corresponding to the flexure element 53 are also used for the flexure element 53 to eliminate duplicate explanation. Regarding the definitive portions a part of the definitive portion for the one micro actuator element 19 will be mainly explained. The other part of the definitive portion for the other micro actuator element 21 will be explained incidentally as required.

The frame 71 and the flexure elements 53 of the semi-finished product part 73 have a common metal base 85 made by etching a single metal plate or foil such as stainless steel foil. The metal base 85 in the flexure element 53 corresponds to the metal base 31 of the flexure 7.

The flexure element 53 has the wiring part 29 formed on the metal base 85.

Figure 9:
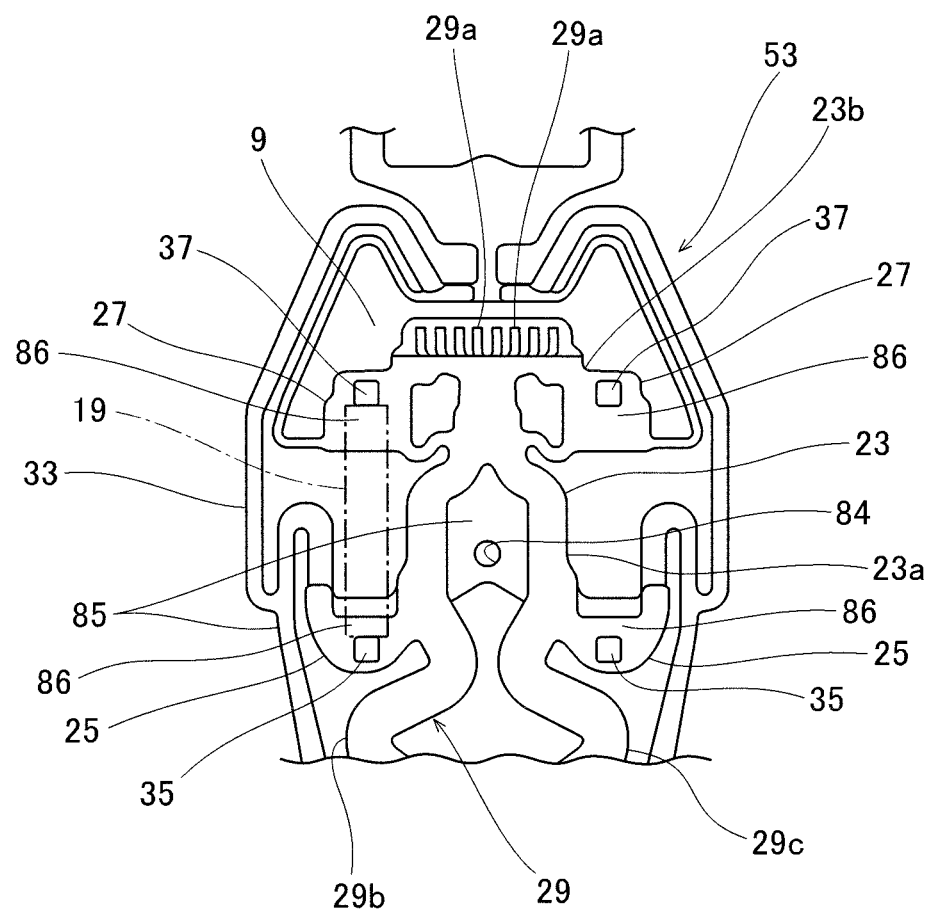
FIG. 9 is a plan view illustrating an actuator-mounting portion of a flexure element of the chain sheet of FIG. 8 and the periphery thereof.
Figure 10:
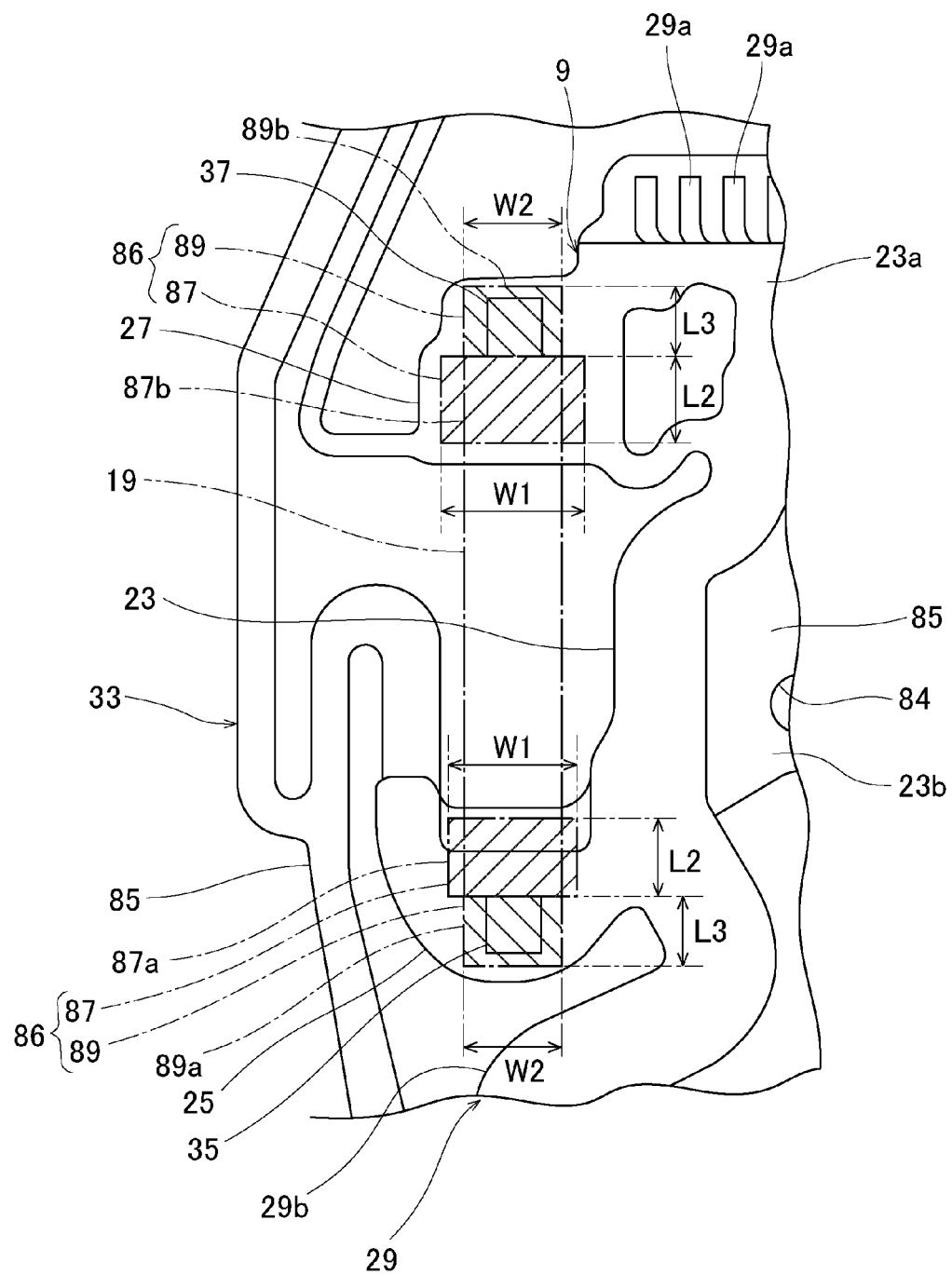
FIG. 10 is an enlarged plan view partly illustrating a definitive portion of the actuator-mounting portion of FIG. 9 and the periphery thereof.

FIG. 9 is an enlarged plan view illustrating an actuator-mounting portion 9 of the flexure element 53 and the periphery thereof and FIG. 10 is an enlarged plan view illustrating a definitive portion 86 of the actuator-mounting portion 9 and the periphery thereof.

As illustrated in FIGS. 7-10, the flexure element 53 has the actuator-mounting part 9. The actuator-mounting part 9 is provided with a tongue 23, first and second support portions 25 and 27, terminals 35 and 37, outriggers 33 and the like.

The stationary part 23a of the tongue 23 is provided with a reference hole 84. The reference hole 84 is used for image processing when mounting the micro actuator element 19 on the tongue 23.

The first and second support portions 25 and 27 are provided with the definitive portion 86 for the agent. The definitive portion 86 is a part to which unhardened first and second agents 43 and 45 are definitively fed. The first agent 43 is the non-conductive adhesive agent and the second agent 45 is the conductive adhesive agent such as silver paste.

The definitive portion 86 has first and second definitive spots 87 and 89 arranged separately back and forth in the X direction for each one of the micro actuator elements 19 and 21.

The first definitive spots 87 in FIG. 10 are the definitive spots 87a and 87b on respective sides in the X direction. The first definitive spots 87a and 87b are areas on which drops of an unhardened non-conductive agent 43 are fed to fix the micro actuator element 19, respectively.

The first definitive spots 87a and 87b according to the first embodiment are arranged at four respective positions on the actuator-mounting portion 9 in proportion to the pair of the micro actuator elements 19 and 21. To the four first definitive spots 87a and 87b, the drops of the agent 43 are simultaneously fed using the multi-outlet nozzle 51b.

The second definitive spots 89 in FIG. 10 are arranged adjacent to the respective first definitive spots 87 in the X direction. The second definitive spots 89 are the definitive spots 89a and 89b covering the corresponding terminals 35 and 37. The second definitive spots 89a and 89b are areas on which drops of an unhardened conductive agent are fed to electrically connect the micro actuator element 21 to the terminals 35 and 37, respectively.

The second definitive spots 89a and 89b according to the first embodiment are arranged at four respective positions on the actuator-mounting portion 9. To the four second definitive spots 89a and 89b, the drops of the agent 45 are simultaneously fed using the multi-outlet nozzle.

As illustrated in FIG. 8, the frame 71 has a waste portion 91 on the outer vertical portion 75 thereof. The waste portion 91 is formed on each one of the frame units 69a-69d.

The waste portion 91 has the same form as the definitive portion 86. Namely, the waste portion 91 has the same surface characteristic as the definitive portion 86. The surface characteristic includes a planar shape, roughness and other properties of the surface of the waste portion 91. According to the first embodiment, the surface characteristic includes the planar shape, the sectional shape including level differences, the surface roughness and the like of the surface. The surface characteristic may be at least any one of the planar shape, the sectional shape, the surface roughness and the like of the waste portion 19.

The waste portion 91 according to the first embodiment includes a few peripheral structures of after-mentioned waste spots 97 and 99 corresponding to the peripheral structures of the definitive spots 87 and 89 of the definitive portion 86. The peripheral structures of the waste portion 91 may be omitted.

The positional relationship between the waste portion 91 and the first definitive portion 86 on the flexure element 53 is the same as the positional relationship between the definitive portions 86 laterally adjacent to each other. The first flexure element 53 is laterally adjacent to the outer vertical portion 75 of the frame 71.

Figure 11:
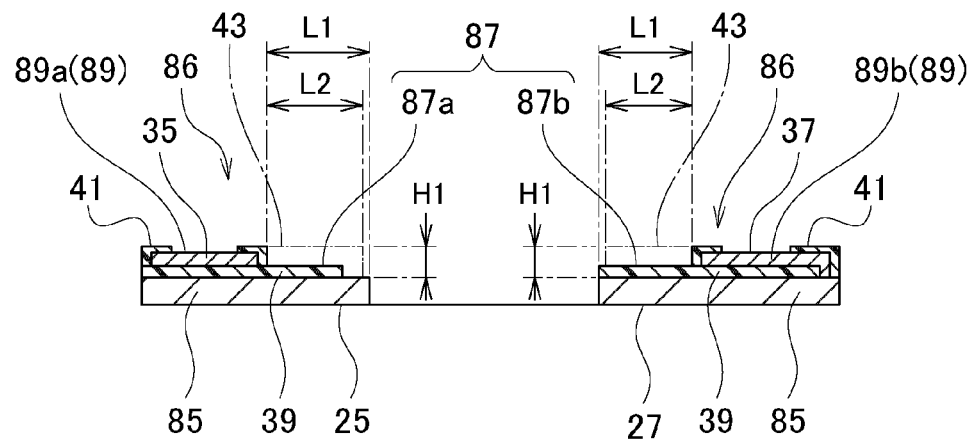
FIG. 11A is an enlarged sectional view partly illustrating the definitive portion of FIG. 10.
FIG. 11B is an enlarged sectional view partly illustrating a waste portion with a plane corresponding to FIG. 11A according to the first embodiment.
Figure 11B:
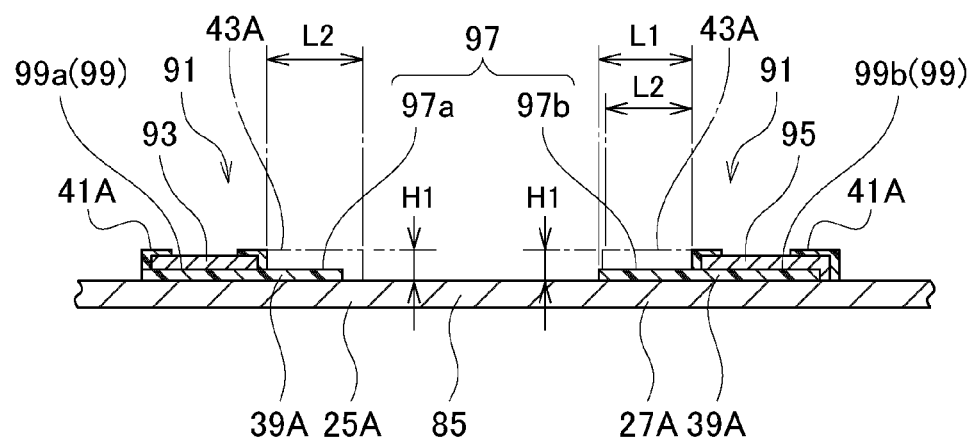

FIG. 11A is an enlarged sectional view partly illustrating the definitive portion 86 and FIG. 11B is an enlarged sectional view partly illustrating the waste portion 91 with a plane corresponding to FIG. 11A.

As illustrated in FIGS. 8 and 11A-11B, the waste portion 91 includes pseudo terminals 93 and 95 for wasteful feeds corresponding to the terminals 35 and 37 of the flexure element 53.

The waste portion 91 includes first and second waste spots 97 and 99 and a pseudo reference hole 100.

The first and second waste spots 97 and 99 correspond to the first and second definitive spots 87 and 89 and the pseudo reference hole 100 corresponds to the reference hole 84 for the definitive feed, respectively.

The first waste spots 97 includes the waste spots 97a and 97b arranged on respective sides in the X direction.

The first waste spots 97a and 97b have the same surface characteristic, in particular the same planar shape, sectional shape, and surface roughness, as those of the first definitive spots 87a and 87b.

Any one, two or all of the planar shape, sectional shape, and surface roughness of the first waste spots 97a and 97b may be slightly different from of the definitive spots 87a and 87b unless the differences affect the remaining amount of the agent in the nozzle 51b. The aforementioned same surface characteristic includes the case involving such differences.

The first waste spots 97a and 97b are areas to which the unhardened non-conductive agent 43 is wastefully fed before the definitive feeds to the first definitive spots 87a and 87b of the definitive portion 86 of the first flexure element 53.

The first waste spots 97a and 97b are formed at four positions corresponding to the first definitive spots 87a and 87b. To the four first waste spots 97a and 97b, the drops of the agent 43 will be simultaneously wastefully fed using the nozzle 51b (multi-outlet nozzle).

The second waste spots 99 are adjacent to the first waste spots 97 in the X direction. The second waste spots 99 includes waste spots 99a and 99b involving terminals 93 and 95 for wasteful feeds on respective sides in the X direction. The second waste spots 99a and 99b have the same surface characteristic, in particular the same planar shape, sectional shape, surface roughness, as the second definitive spots 89a and 89b. Any one, two or all of the planar shape, sectional shape, and surface roughness of the second waste spots 99a and 99b may be slightly different from of the definitive spots 89a and 89b unless the differences affect the remaining amount of the agent in the nozzle 51b. The aforementioned same surface characteristic includes the case involving such differences.

The second waste spots 99a and 99b are areas to which the unhardened conductive agent 45 is wastefully fed before the definitive feeds to the second definitive spots 89a and 89b of the first flexure element 53.

The second waste spots 99a and 99b are formed at four positions corresponding to the second definitive spots 89a and 89b. To the four second waste spots 99a and 99b, the drops of the agent 45 will be simultaneously wastefully fed using the multi-outlet nozzle.

In the vertical direction of the chain sheet 55 along which the frame units are sequentially arranged and the lateral direction of the chain sheet 55 along which the flexure elements are sequentially arranged, the relative positions of the first waste spots 97a and 97b and the second waste spots 99a and 99b correspond to those of the first definitive spots 87a and 87b and the second definitive spots 89a and 89b.

A pitch or distance as the positional relationship between the waste portion 91 and the first definitive portion 86 of the first flexure element 53 corresponds to a pitch or distance between the definitive portions 86 of the adjacent flexure elements 53.

Namely, the travel distance of the nozzle 51b between the waste portion 91 and the first definitive portion 86 is the same as that between the adjacent definitive portions 86.

The position of the pseudo reference hole 100 in the waste portion 91 is the same as the position of the reference hole 84 in the definitive portion 86 in the vertical and lateral directions of the chain sheet 55.

Namely, the pseudo reference hole 100 is used for image processing similarly to the reference hole 84.

Figure 12A:
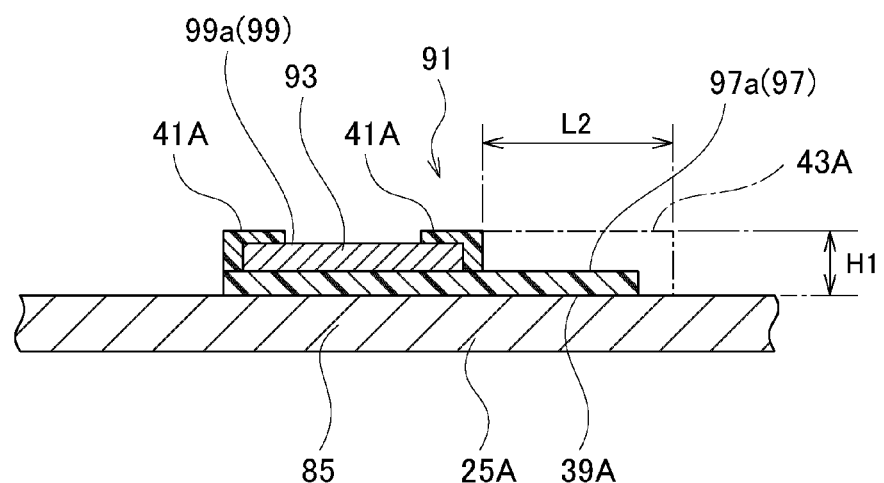
FIG. 12A is an enlarged sectional view illustrating one of first waste spots of the waste portion of FIG. 11B
Figure 12B:
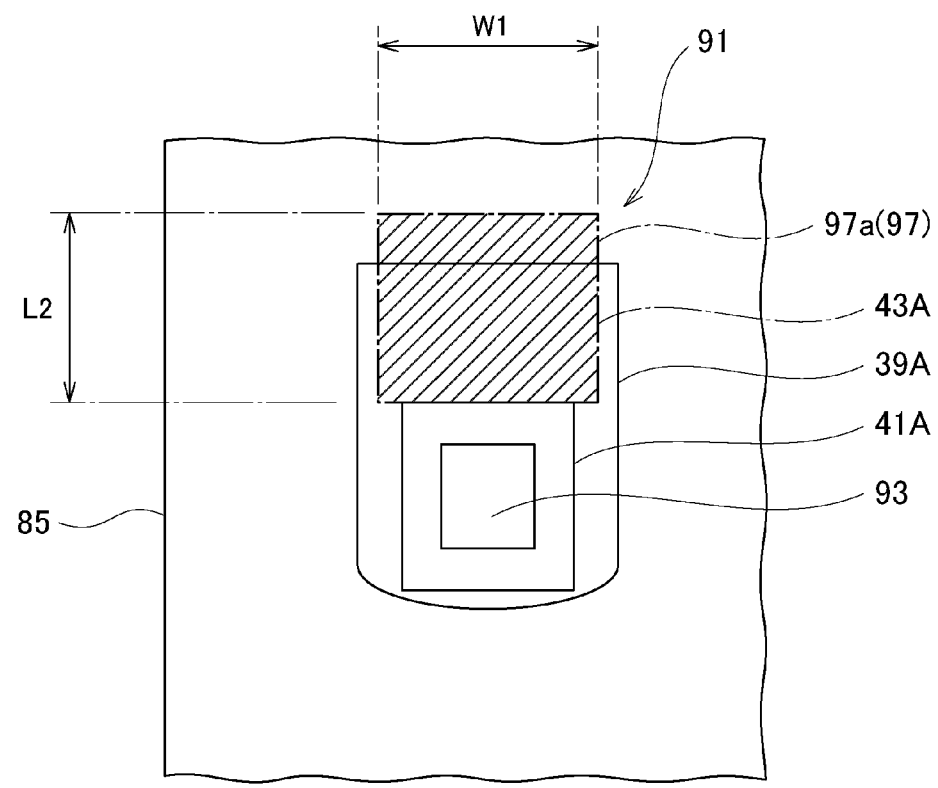
FIG. 12B is an enlarged plan view illustrating the same.
Figure 13A:
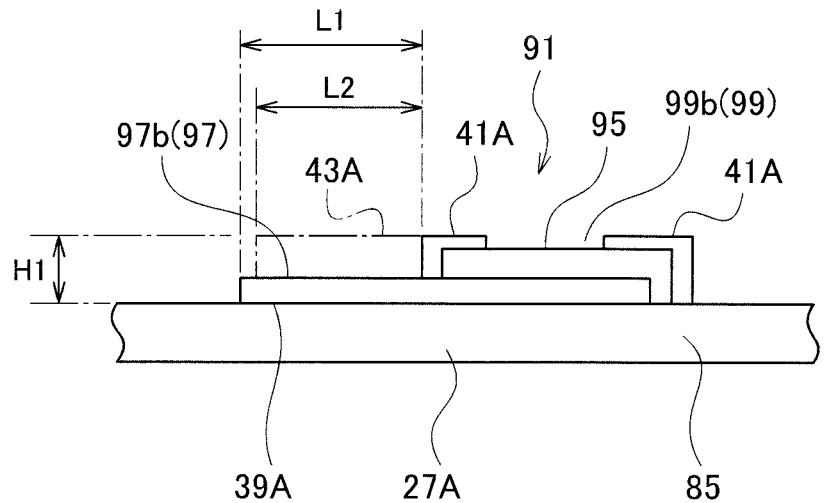
FIG. 13A is an enlarged sectional view illustrating the other of the first waste spots of the waste portion of FIG. 11B
Figure 13B:
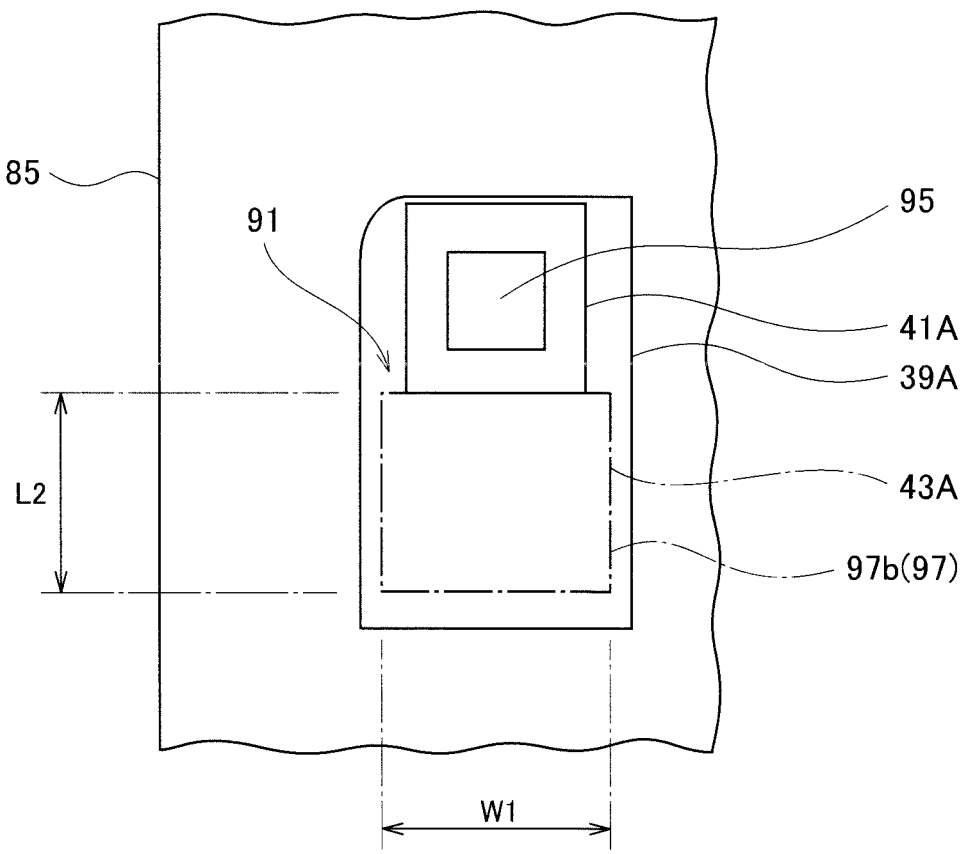
FIG. 13B is an enlarged plan view illustrating the same.

FIG. 12A is a sectional view illustrating one of the first waste spots 97a and 97b in the X direction and FIG. 12B is a plan view illustrating the same. FIG. 13A is a sectional view mainly illustrating the other of the first waste spots 97a and 97b in the X direction and FIG. 13B is a plan view illustrating the same.

The first waste spots 97 of the waste portion 91 of FIGS. 11B-13B have the same planar shape and sectional shape as those of the first definitive spots 87 of the definitive portion 86 of FIGS. 10 and 11A.

First and second pseudo support portions 25A and 27A are continuous to each other with a part of the metal base 85 in the waste portion 91 whereas the first and second support portions 25 and 27 for the definitive portion 86 are not continuous with absence of the metal base 85 between the support portions 25 and 27. The continuation between the first and second pseudo support portions 25A and 27A does not affect the planar shape and the sectional shape of the waste portion 91.

In addition, the waste portion 91 includes an insulating layer 39A and a cover layer 41A corresponding to the insulating layer 39 and the cover layer 41 of the definitive portion 86 and having the same shape as those layers 39 and 41.

In the definitive portion 86, the distances between the inner ends of the cover layers 41 in the X direction and the respective inner ends of the first and second support portions 25 and 27 in the X direction are the same distance L1. The lengths of the first definitive spots 87a and 87b measured from the respective cover layers 41 within the distances L1 are the same length L2. The heights from the surface of the metal base 85 to the surfaces of the cover layers 41 are the same height H1. The widths of the first and second definitive spots 87a and 87b are the same width W1.

The length L2 is slightly smaller than the distance L1. This structure prevents the agent 43 from oozing out from the first and second support portions 25 and 27 as much as possible when the micro actuator element 19 is put on the support portions 25 and 27. The length L2 may be the same as the distance L1.

In the one definitive spot 87a, there is a step defining by the insulating layer on the metal base 85 within the length L2. In the other definitive spot 87b, the insulating layer 39 covers the metal base 85 up to the inner end of the second support portion 27 and therefore there is no step within the length L2.

According to the length L2, the height H1 and the width W1, the nozzle 51b of the agent-feeding apparatus 56 is set.

As illustrated in FIGS. 11A-12A and 13A, the first waste spots 97a and 97b have the length L2 and the height H1 equal to those of the first definitive spots 87a and 87b.

In the one waste spot 97a, there is a step defined by the insulating layer 39 on the metal base 85 within the length L2 similar to the definitive spot 87a. In the other waste spot 97b, there is no step within the length L2 similar to the definitive spot 87b.

As illustrated in FIGS. 12B and 13B, the first waste spots 97a and 97b have the width W1 equal to that of the first definitive spots 87a and 87b.

The width W1 is slightly larger than the width of the micro actuator element 19. The width W1 may be the same as or less than the width of the micro actuator element 19.

Figure 14A:
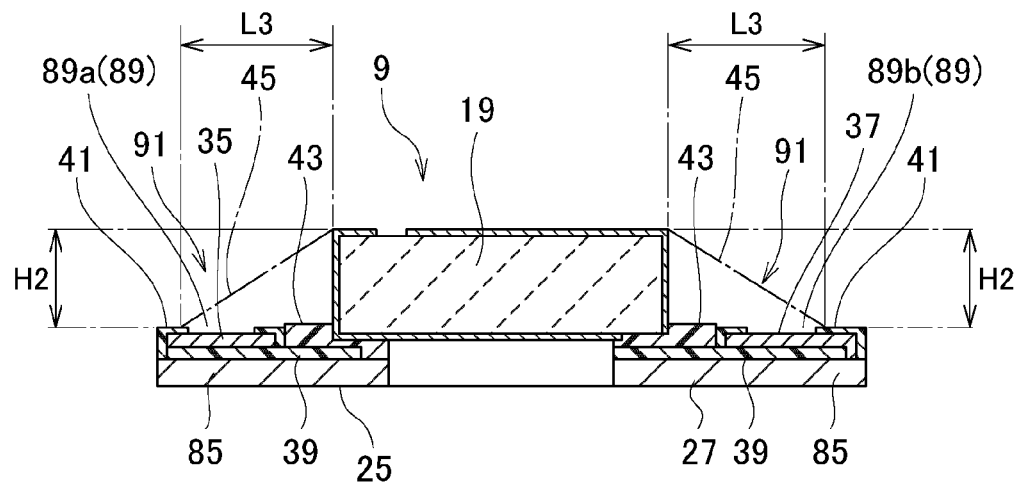
FIG. 14A is an enlarged sectional view partly illustrating second definitive spots of the definitive portion with a micro actuator element being mounted according to the first embodiment.
Figure 14B:
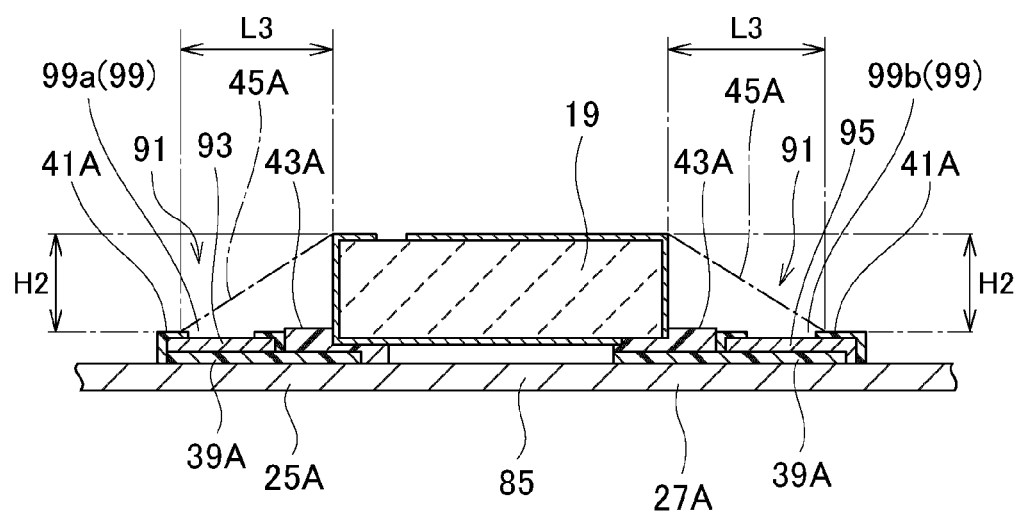
FIG. 14B is an enlarged sectional view illustrating second waste spots of the waste portion with a plane corresponding to FIG. 14A according to the first embodiment.
Figure 15A:
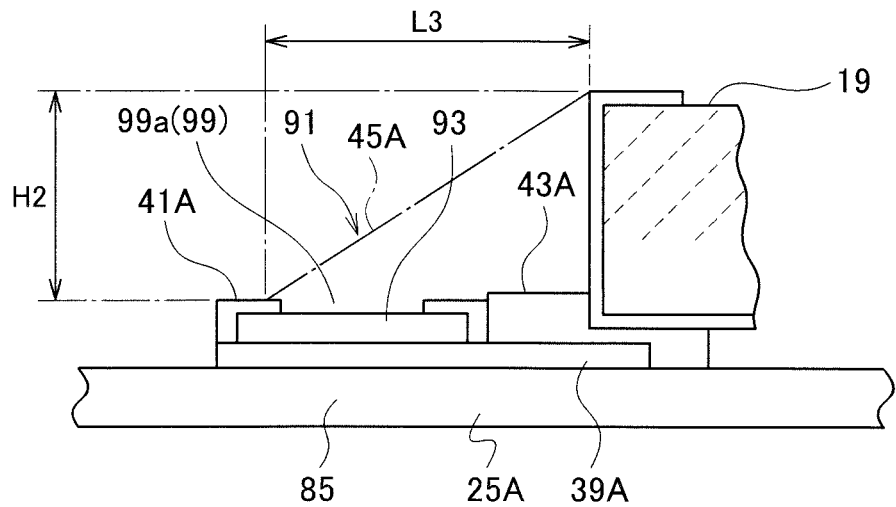
FIG. 15A is an enlarged sectional view illustrating one of the second waste spots of the waste portion of FIG. 14B with the micro actuator element being mounted and FIG. 15B is an enlarged plan view illustrating the same.
Figure 15B:
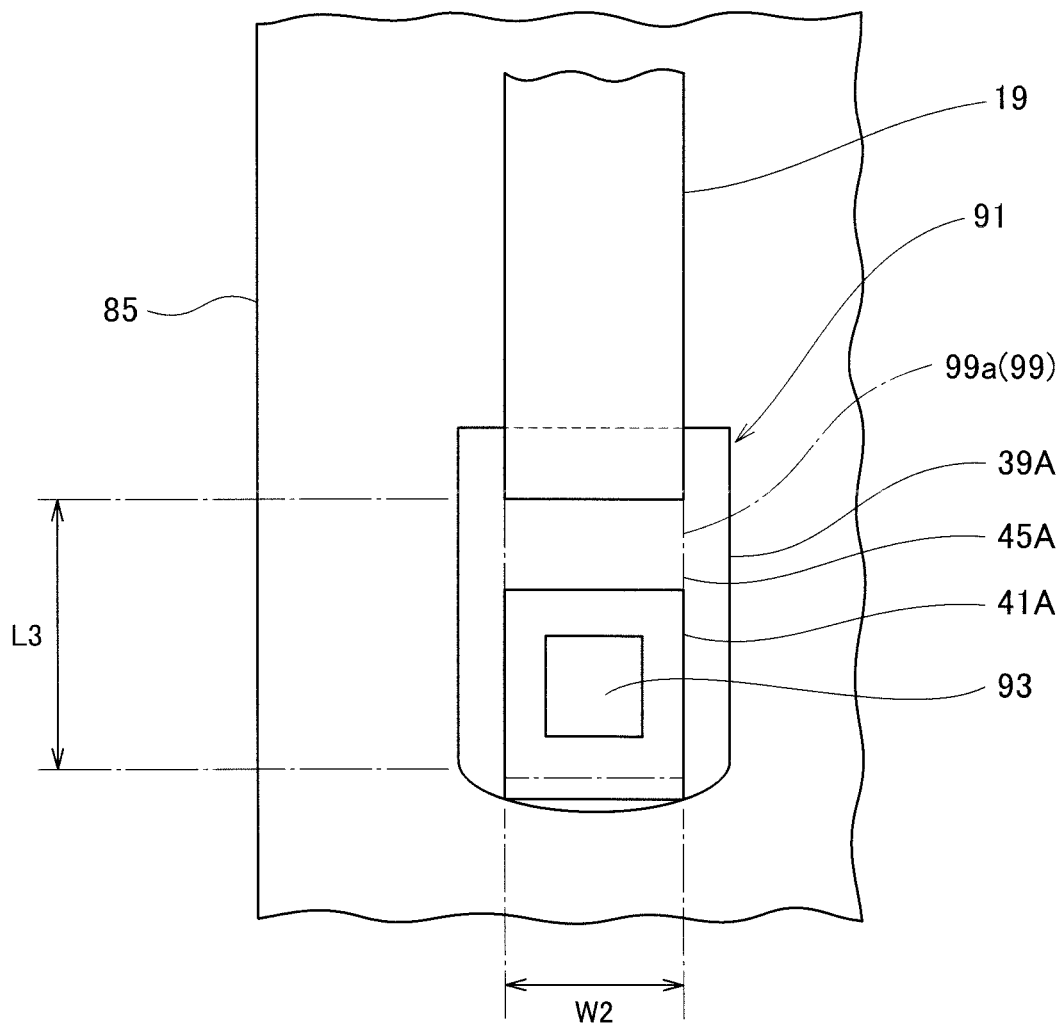
Figure 16A:
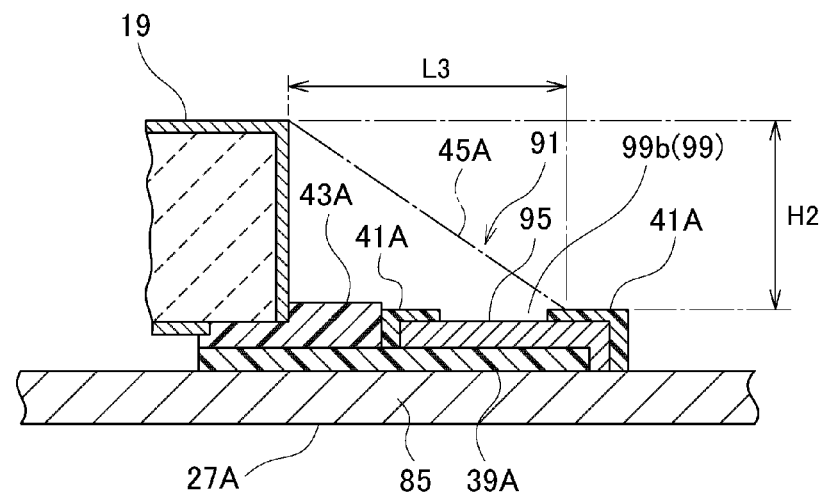
FIG. 16A is an enlarged sectional view illustrating the other of the waste spots of the waste portion of FIG. 14B with the micro actuator element being mounted and FIG. 16B is an enlarged plan view illustrating the same.
Figure 16B:
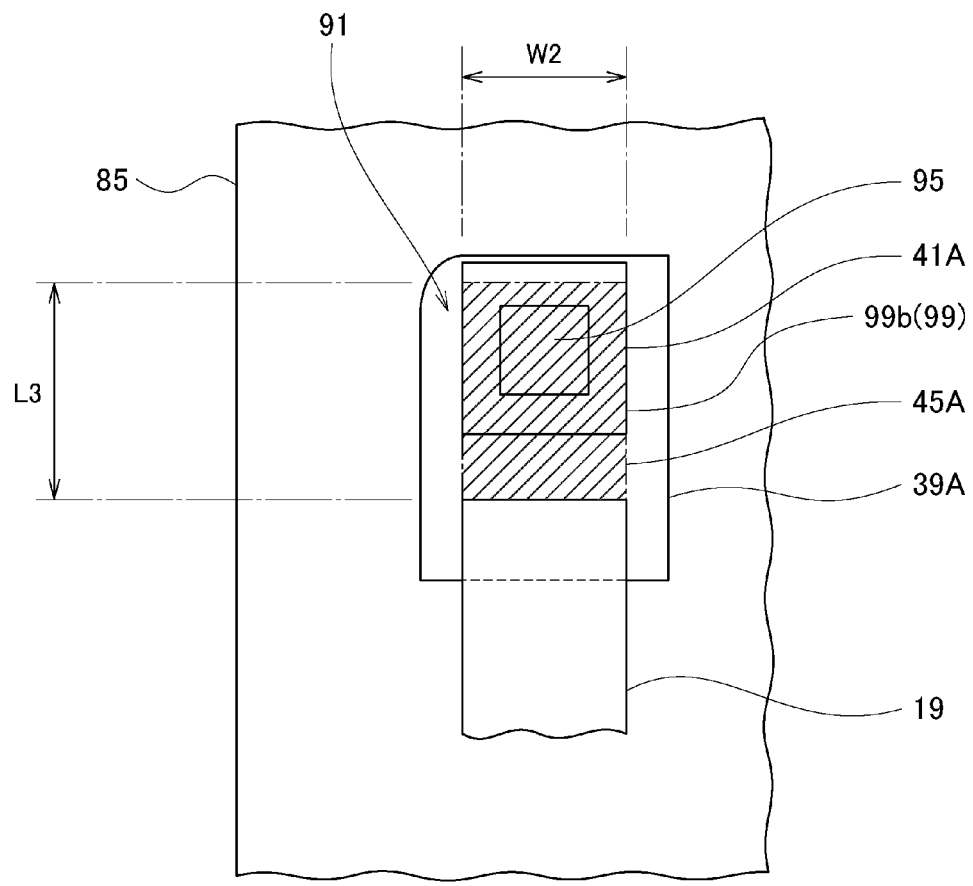

FIG. 14A is an enlarged sectional view illustrating the second definitive spots 89a and 89b, with the plane along the X direction, of the definitive portion 86 with the micro actuator element 19 being mounted, and FIG. 14B is an enlarged sectional view illustrating the second waste spots 99a and 99b of the waste portion 91 with a plane corresponding to FIG. 14A. FIG. 15A is an enlarged sectional view illustrating one of the second waste spots 99a and 99b with the micro actuator element 19 being mounted with the plane along the X direction and FIG. 15B is an enlarged plan view illustrating the same. FIG. 16A is an enlarged sectional view illustrating the other of the second waste spots 99a and 99b of the waste portion 91 with the micro actuator element 19 being mounted with the plane along the X direction and FIG. 16B is an enlarged plan view illustrating the same.

The waste portion 91 of FIGS. 14B-16B including the pseudo terminals 93 and 95, the second waste spots 99 and the micro actuator element 19 has the same planar shape and sectional shape as those of the definitive portion 86 of FIGS. 10 and 14A including the terminals 35 and 37, the second definitive spots 89 and the micro actuator element 19. In addition, the micro actuator element 19 for the waste portion 91 may be a pseudo one.

In the second waste spots 89a and 89b, the lengths spanning from the ends of the micro actuator element 19 to the respective cover layers 41 across the terminals 35 and 37 are the same length L3. The heights from the surfaces of the respective cover layers 41 to the surface of the micro actuator element 19 are the same height H2. The widths of the second definitive spots 89a and 89b are the same width W2.

In the second definitive spots 89a and 89b, there are steps defined between the solids of the adhesive 43 and the cover layers 41 and between the terminals 35 and 37 and the cover layers 41 within the length L3.

According to the length L3, the height H2 and the width W2, the nozzle 51b of the agent-feeding apparatus 56 is set.

As illustrated in FIGS. 14A-15A and 16A, the second waste spots 99a and 99b have the length L3 and the height H2 equal to those of the second definitive spots 89a and 89b.

In the second waste spots 99a and 99b, there are steps defined between the solids of the adhesive 43A and the cover layers 41A and between the terminals 93 and 95 and the cover layers 41 within the length L3 similar to the second definitive spots 89a and 89b.

As illustrated in FIGS. 15B and 16B, the second waste spots 99a and 99b have the width W2. The width W2 is the same as that of the micro actuator element 19. The width W2, however, may be larger or less than the width of the micro actuator element 19.

The agent-feeding method will be explained in detail.

In FIGS. 5 and 6, the feeding head 51 moves from the standby position or initial position directly to the definitively feeding stage 63 according to the control signal output from the controller.

Over the definitively feeding stage 63, the nozzle 51b is positioned to the waste portion 91 on the outer vertical portion 75 of the frame 71 of FIG. 8.

At the time of this positioning, a camera takes an image of the entire waste portion 91 including the pseudo reference hole 100. With this image, image processing is conducted on the basis of the pseudo reference hole 100 to position the nozzle 51b. The definitively feeding stage 63 may have a positioning pin to be passed through the pseudo reference hole 100.

At the position, the nozzle 51b discharges the agent 43 from the tip end thereof with the compressed air introduced into the syringe 51a from the dispenser 49.

With this discharging, the drops of the unhardened agent 33A are wastefully fed to the four waste spots 97a and 97b of FIGS. 8 and 11-16B with the same amount as the predetermined amount for the definitive portion 86.

With the wasteful feeds, the previously remaining agent in the nozzle 51b are discharged to fill the nozzle 51b with the new or fresh agent even if the characteristic of the previously remaining agent is changed by volatilization or the like during the movement of the nozzle 51b from the standby position to the waste portion 91.

After the wasteful feeds at the waste portion 91, the nozzle 51b is positioned to the first definitive portion 86 of the first flexure element 53 adjacent to the waste portion 91.

At the time of this positioning, a camera takes an image of the entire definitive portion 86 including the reference hole 84 (FIG. 8). With this image, image processing is conducted on the basis of the reference hole 84 to position the nozzle 51b. The definitively feeding stage 63 may have a positioning pin to be passed through the reference hole 84.

At the position, the nozzle 51b discharges the agent 43 from the tip end thereof with the compressed air introduced into the syringe 51a from the dispenser 49.

With this discharging, the drops of the unhardened agent 43 are definitively fed to the four definitive spots 87a and 87b of FIGS. 8 and 11A with the predetermined amount.

The pitch between the first definitive portion 86 and the waste portion 91 is the same as that between the adjacent definitive portions 86 as mentioned above. This uniforms the characteristic of the filling or remaining agent in the nozzle 51b just before definitively feeding the agent 43 to each definitive portion 86. The pitches may be different from each other as long as the characteristic such as viscosity of the filling or remaining agent in the nozzle 51b is uniformed.

The nozzle 51b intermittently moves at the pitches to definitively sequentially feed the agent 43 to the four definitive spots 87a and 87b of the definitive portion 86 of the respective chained flexure elements 53 with the same amounts.

Namely, the nozzle 51b wastefully feeds the agent 43 to the waste portion 91 and thereafter starts the intermittently moving for the definitive feeds of the agent 43. The intermittently moving means that the nozzle 51b moves to and stops at the plurality of the definitive portions 86 one after another such that the nozzle 51b moves to and temporarily stops at one definitive portion 86, conducts the definitive feeds to the one definitive portion 86, and thereafter moves to and temporarily stops at the next definitive portion 86 to conduct the definitive feeds to the next definitive portion 86.

Next, the micro actuator elements 19 are put on the waste portion 91 and the definitive portions 86 as illustrated in FIGS. 14A and 14B, respectively. The micro actuator elements 19 are attached to the first and second support portions 25 and 27 and the pseudo first and second support portions 25A and 27A through the drops of the adhesive agent 43 and 43A.

At this time, the micro actuator elements 21 are also attached similar to the above.

Then, the definitively feeding stage 63 is moved to a second agent-feeding apparatus by the driven conveyer 61. The second agent-feeding apparatus is to feed the adhesive agent 45 and 45A such as silver paste. The second agent-feeding apparatus has a nozzle having outlets according to the second definitive spots 89. With the second agent-feeding apparatus, the drops of the agent 45 are fed to the four second definitive spots 89a and 89b. The second agent-feeding apparatus is the same as the agent-feeding apparatus for the agent 43 excepting the arrangement of the outlets of the nozzle.

At this time, the feeding head wastefully feeds the agent 45 to the four second waste spots 99a and 99b with the same amount as the predetermined amount for the second definitive spots 89a and 89b and thereafter starts the intermittently moving to definitively feed the agent 45 to the four second definitive spots 89a and 89b at the predetermined amount.

Figure 17A:
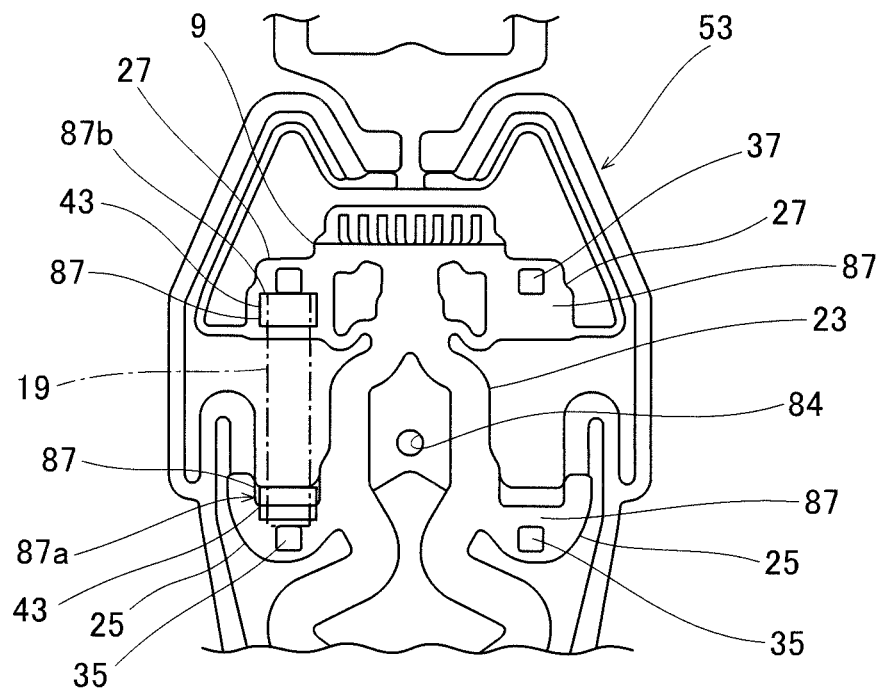
FIG. 17A is an enlarged plan view illustrating the actuator-mounting portion of the flexure element of FIG. 9 and the periphery thereof, with representation of the first definitive spots to which the definitive feeds are conducted on one side.
Figure 17B:
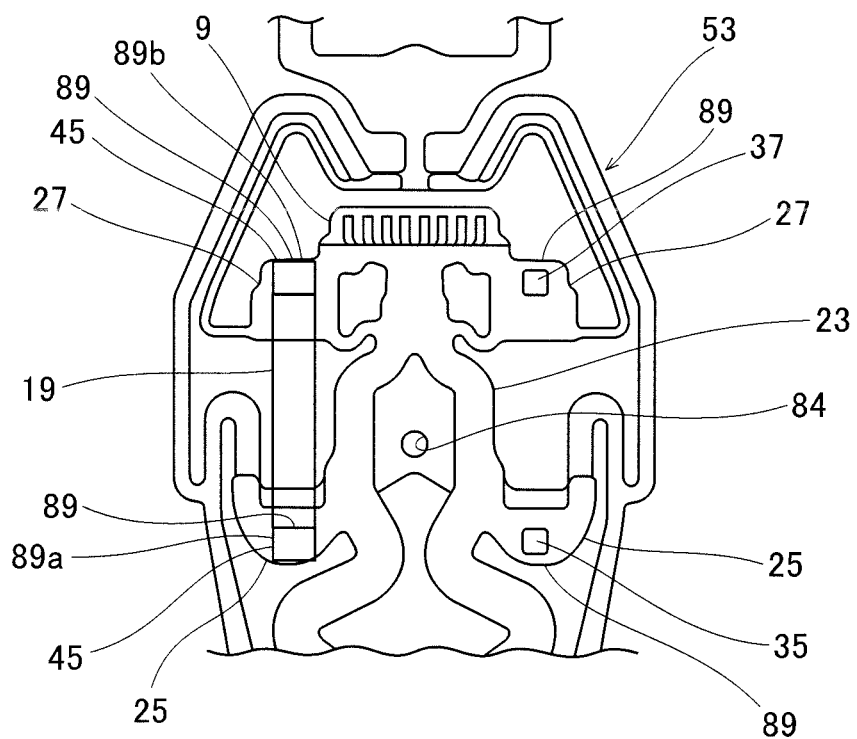
FIG. 17B is an enlarged plan view illustrating the actuator-mounting portion of the flexure element of FIG. 9 and the periphery thereof, with representation of the second definitive spots to which the definitive feeds are conducted on one side.

FIG. 17A is a plan view illustrating the actuator-mounting portion 9 of the flexure element 53 and the periphery thereof, with the presentation of the first definitive spots 87a and 87b to which the definitive feeds are conducted on one side, and FIG. 17B is a plan view illustrating the actuator-mounting portion 9 of the flexure element 53 and the periphery thereof, with representation of the second definitive spots 89a and 89b to which the definitive feeds are conducted on one side.

By the definitive feeds to the first definitive spots 87, the agent 43 is definitively fed as illustrated in FIG. 17A as mentioned above. In FIG. 17A, the definitive feeds are conducted only to the two first definitive spots 87 on one side in the lateral direction for convenience of explanation. Actually, the definitive feeds are conducted to the four first definitive spots 87 on both sides.

After mounting the micro actuator element 19 (21) on the actuator-mounting portion 9, the agent 45 of the silver paste is definitively fed to the second definitive spots 89, thereby to conduct the definitive feeds as illustrated in FIG. 17B as mentioned above. In FIG. 17B, the definitive feeds are conducted only to the two second definitive spots 89 on one side in the lateral direction for convenience of explanation. Actually, the definitive feeds are conducted to the four second definitive spots 89 on both sides.

In the waste portion 91 illustrated in FIGS. 8, 11B and the like, the agent is wastefully fed in the same way as the definitive feeds of FIGS. 17A and 17B as mentioned above.

The major effects according to the first embodiment will be summarized.

According to the first embodiment, the chain sheet 55 has the flexure elements 53 arranged side by side and chained together at the constant pitch or distance. The chain sheet 55 includes the frame 71 through which the flexure elements 53 are chained. The frame 71 includes the waste portion 91 on the outer vertical portion 75 thereof. The drops of the agent are to be fed to the waste portion 91. The waste portion 91 has the same form as the definitive portions 86. The positional relationship between the waste portion 91 and the first definitive portion 86 is the same as the positional relationship between the adjacent definitive portions 86, the first definitive portion 86 being to be firstly fed the agent during the intermittently moving. Namely, the waste portion 91 is arranged in the vertical direction of the frame 71 at the same level as the definitive portion 86 and in the lateral direction of the frame 71 at the same pitch together with the definitive portions 86.

Then, the nozzle 51b conducts the intermittently moving at the pitches. The nozzle 51b starts the intermittently moving for definitive feeds of the agent to the definitive portion 86 with the predetermined amount after the wasteful feeds of the agent to the waste portion 91 conducted with the same amount as the predetermined amount of the definitive feeds.

Accordingly, the definitive feeds are conducted after removing the previously remaining agent in the nozzle 51b whose characteristic may be changed by volatilization or the like during the movement of the nozzle 51b from the standby position.

The amount of the wasteful feeds is the same as the predetermined amount of the definitive feeds according to the first embodiment. The amount of the wasteful feeds may be increased or decreased so as to be substantially the same as the predetermined amount of the definitive feeds as long as the condition of the remaining adhesive in the nozzle 51b after the wasteful feeds is the same as that after the definitive feeds.

The waste portion 91 has the same shape and the like as the definitive portion 86. Accordingly, the remaining agent in the dispenser 49 and the feeding head 51 serving as the feeding part, in particular the nozzle 51b, after the wasteful feeds is the same condition as the remaining agent after the definitive feeds in the nozzle 51b. For example, the substantially same amount is remained in the nozzle 51b in both cases after the wasteful feeds and the definitive feeds.

The nozzle 51b moves in parallel from the waste portion 91 to the first definitive portion 86 by the same pitch as moving in parallel from one definitive portion 86 to the next definitive portion 86. The remaining agents in the nozzle 51b at the respective definitive portions 86 are the same in condition.

Accordingly, the first embodiment stabilizes the characteristic or the amount of the remaining agent in the nozzle 51b just before definitively feeding the agent to each definitive portion 86. As a result, the first embodiment stabilizes the feed amount of the agent at each definitive portion 86 into the predetermined amount.

Since the frame 71 of the chain sheet 55 is to be separated from the flexure elements 53, the flexure elements 53 and therefore the flexures 7 are not unnecessarily enlarged.

The chain sheet 55 according to the first embodiment has the waste portion 91 formed on the outer vertical portion 75 of the frame 71 to be wastefully fed the agent. The waste portion 91 has the same form as the definitive portions 86. Further, the positional relationship between the waste portion 91 and the first definitive portion 86 is the same as the positional relationship between the adjacent definitive portions 86. The first definitive portion 86 is to be firstly fed the agent during the intermittently moving.

The chain sheet 55, therefore, allows the wasteful feeds to be effectively performed by the agent-feeding method according to the first embodiment.

The first embodiment allow various alterations to be applied.

The wasteful feeds may be conducted for any one of the adhesive agents 43 and 45.

According to the first embodiment, the manufacturing process is configured to sequentially perform the steps of the feeding of the non-conductive adhesive agent, the mounting of the elements, and the feeding of the conductive adhesive agent. The process may employ another configuration and/or perform the steps in different order according to a structure of a product such as head suspension. For example, the manufacturing process may sequentially perform the feeding of the conductive adhesive agent, the mounting of the elements, and the feeding of the non-conductive adhesive agent or the mounting of the elements, the feeding of the conductive adhesive agent, and the feeding of the non-conductive adhesive agent.

In the feeding part, the shape of the nozzle 51b may be freely set insofar as the feeding part is allowed to perform the definitive feeds and the wasteful feed. For example, the feeding part may feed the unhardened adhesive agent in a straight line instead of a drop shape. As the feeding part, various nozzles such as inkjet nozzle may be employed for the agent-feeding method.

The structural object is not limited to the chain sheet 55 of the flexure elements 53 and may be another object such as circuit board that is provided with a plurality of definitive portions.

The plurality of the definitive portions may involve slight variation in pitch between the adjacent definitive portions and/or in vertical position.

Each one of the definitive portion may have a single definitive spot instead of a plurality of the definitive spots 87 and 89.

The flowable agent is not limited to the non-conductive or conductive adhesive agent and may be another agent such as ink to be fed to a target spot.

The same form for the waste portion and the definitive portions means both or any one of the same surface characteristic such as surface shape and the same positional relationship relative to the adjacent definitive portion.

The waste portion may be slightly different from the definitive portions in position relationship relative to the adjacent definitive portion if the waste portion is the same surface characteristic as the definitive portions.

The waste portion may be slightly different from the definitive portions in surface characteristic if the waste portion is the same positional relationship relative to the adjacent definitive portion as the definitive portion.

The waste portion may be a single planar area that allows wasteful feeds to be conducted thereon using a multi-outlet nozzle and such a waste portion is also one embodiment having the same form as the definitive portions.

Figure 18:
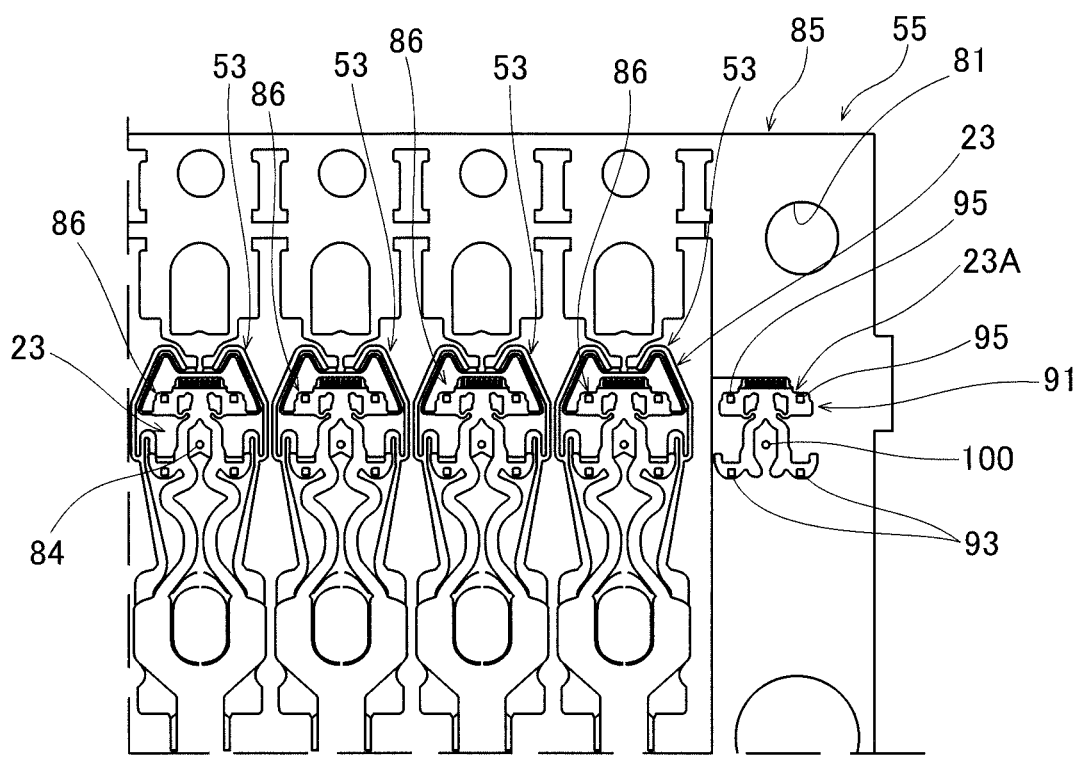
FIG. 18 is a plan view illustrating part of a chain sheet according to a second embodiment of the present invention, the part of the chain sheet corresponding to the part IIX of FIG. 7.
Figure 19:
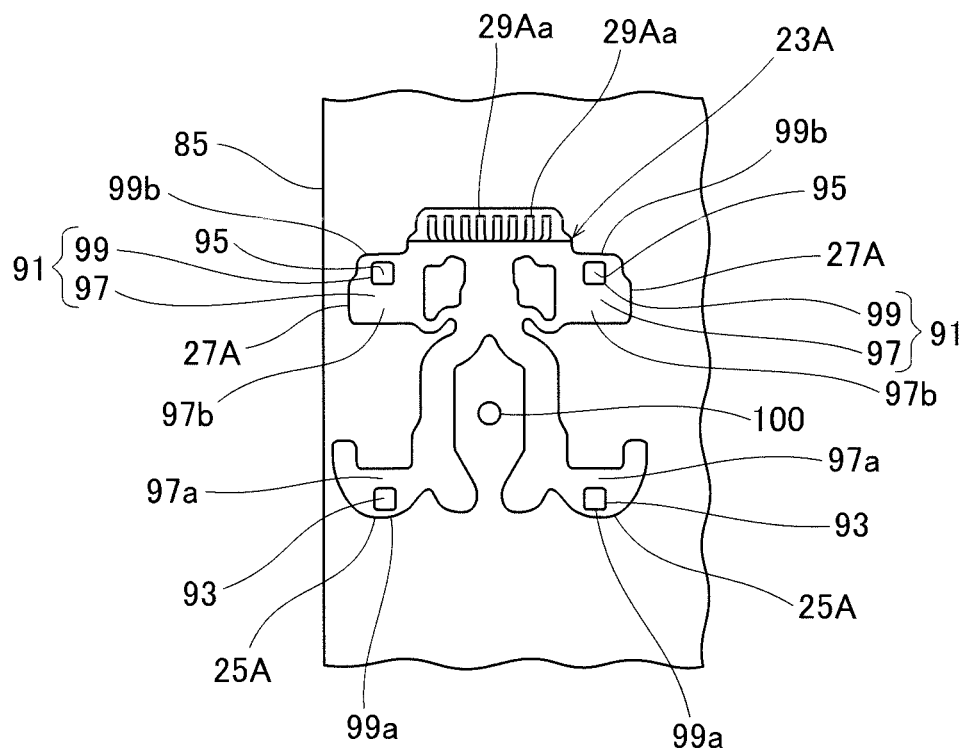
FIG. 19 is an enlarged plan view illustrating a waste portion according to the second embodiment.
Figure 20:
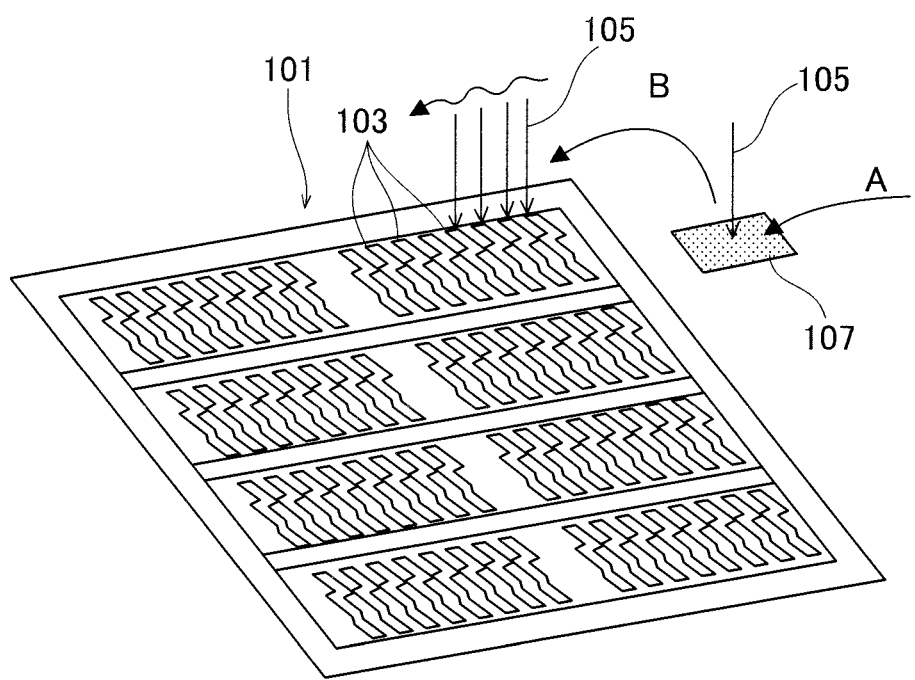
FIG. 20 is a perspective view illustrating a chain sheet according to the related art.

FIG. 18 is a plan view illustrating a part of a chain sheet according to the second embodiment of the present invention, the part of the chain sheet corresponding to the part IIX of FIG. 7. FIG. 19 is a plan view illustrating a waste portion according to the second embodiment.

According to the second embodiment, a pseudo tongue 23A is formed on an outer vertical portion 75 of a frame 71. The sectional shape of the pseudo tongue 23A is the same as the sectional shape of FIG. 11B. The planar shape of the pseudo tongue 23A is a shape symbolizing a tongue 23.

The pseudo tongue 23A, therefore, is provided with pseudo terminals 93 and 95, a pseudo reference hole 100 and pseudo terminals 29Aa for a slider 11.

The waste portion 91 including the pseudo tongue 23A has the same form as definitive portions 86 similar to the first embodiment. The positional relationship between the waste portion 91 and the first definitive portion 86 is the same as the positional relationship between the adjacent definitive portions 86. Namely, the pseudo tongue 23A is arranged side by side in parallel with the tongues 23 so that the pitch between the pseudo tongue 23A of the waste portion 91 and the first tongue 23 of the first definitive portion 86 is the same as the pitch between the adjacent tongues 23 of the adjacent definitive portions 86.

Around the pseudo terminals 93 and 95, an insulating layer 39A and a cover layer 41A are provided and a distance L1, lengths L2 and L3, a height H1, widths W1 and W2 are set similar to FIGS. 11A-16B.

Then, the second embodiment conducts wasteful feeds and definitive feeds in the same way as the first embodiment.

According to the second embodiment, a nozzle 51b is positioned to the pseudo terminal 23A with more high accuracy through image processing for the positioning of the nozzle 51b using an image of the pseudo terminal 23A which has the same shape as the tongue 23.

In addition, the second embodiment also provides the same effects as the first embodiment.

The various alterations are applicable to the second embodiment similar to the first embodiment.

What is claimed is:
1. A structural object comprising:
a semi-finished product part and a frame configured to be separated from the semi-finished product part;
definitive portions formed on the semi-finished product part, each of the definitive portions having a set of definitive spots, each of the definitive spots being configured to be definitively fed a respective discrete mass of a flowable agent; and
a waste portion formed on the frame, the waste portion having a set of waste spots, each of the waste spots being configured to be wastefully fed the flowable agent,
wherein
each of the waste spots has a planar shape or a sectional shape and dimensions thereof which are identical to a planar or a sectional shape and dimensions thereof of a respective one of the definitive spots, on
the set of waste spots is a duplicate of the set of definitive spots translated in a same plane.

2. The structural object according to claim 1, wherein the semi-finished product part has a plurality of objects arranged side by side and chained together with respect to the frame, the objects including the respective definitive portions.

3. The structural object according to claim 2, wherein the objects are semi-finished flexures each configured to be used for a head suspension.

4. The structural object according to claim 1, wherein the waste portion has a same surface characteristic as the definitive portions.

5. The structural object according to claim 1, wherein a positional relationship between the waste portion and a first definitive portion is same as a positional relationship between adjacent definitive portions, the first definitive portion being a first one of the definitive portions that is adjacent to the frame in a direction in which the definitive portions are successive.

6. The structural object according to claim 1, wherein the definitive portions are exposed to outside.

7. A method of feeding an agent, comprising:
intermittently moving a feeding part to a plurality of definitive portions defined on a structural object to definitively feed a flowable agent with a predetermined amount to each one of the definitive portions, wherein
the structural object includes a semi-finished product part with the definitive portions and a frame configured to be separated from the semi-finished product part,
the frame includes a waste portion for the flowable agent, each of the definitive portions has a set of definitive spots, each of the definitive spots being configured to be definitively fed a respective discrete mass of the flowable agent, the waste portion has a set of waste spots, each of the waste spots being configured to be wastefully fed the flowable agent, wherein each of the waste spots has a planar shape or a sectional shape and dimensions thereof which are identical to a planar or a sectional shape and dimensions thereof of a respective one of the definitive spots, and the set of waste spots is a duplicate of the set of definitive spots translated in a same plane, and the feeding part wastefully feeds the flowable agent to the waste portion with a same amount as said predetermined amount and thereafter starts the intermittently moving for definitively feeding of the flowable agent.

8. The method according to claim 7, wherein the semi-finished product part has a plurality of objects arranged side by side and chained together with respect to the frame, the objects including the respective definitive portions, and the feeding part conducts the intermittently moving so as to stop at each object for the definitively feeding.

9. The method according to claim 8, wherein the objects are semi-finished flexures each used for a head suspension, the structural object is a chain sheet in which the semi-finished flexures are chained together, and the feeding part conducts the intermittently moving so as to stop at each semi-finished flexure for the definitively feeding.

10. The method according to claim 7, wherein the waste portion has a same surface characteristic as the definitive portions.

11. The method according to claim 7, wherein a positional relationship between the waste portion and a first definitive portion is same as a positional relationship between adjacent definitive portions, the first definitive portion being a first one of the definitive portions to be firstly definitively fed the flowable agent during the intermittently moving of the feeding part, and the feeding part starts intermittently moving from the waste portion.

* * * * *